US012464504B2

(12) United States Patent
Lin et al.

(10) Patent No.: US 12,464,504 B2
(45) Date of Patent: Nov. 4, 2025

(54) TRANSMISSION SCHEDULING IN A WIRELESS COMMUNICATION NETWORK

(71) Applicant: Telefonaktiebolaget LM Ericsson (publ), Stockholm (SE)

(72) Inventors: Xingqin Lin, San José, CA (US); Du Ho Kang, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 400 days.

(21) Appl. No.: 18/010,896

(22) PCT Filed: Jun. 29, 2021

(86) PCT No.: PCT/SE2021/050646
§ 371 (c)(1),
(2) Date: Dec. 16, 2022

(87) PCT Pub. No.: WO2022/005380
PCT Pub. Date: Jan. 6, 2022

(65) Prior Publication Data
US 2023/0247595 A1   Aug. 3, 2023

Related U.S. Application Data

(60) Provisional application No. 63/045,224, filed on Jun. 29, 2020.

(51) Int. Cl.
H04W 72/0446    (2023.01)
H04L 5/00       (2006.01)
H04W 72/232     (2023.01)

(52) U.S. Cl.
CPC ....... H04W 72/0446 (2013.01); H04L 5/0053 (2013.01); H04W 72/232 (2023.01)

(58) Field of Classification Search
CPC .......... H04W 72/0446; H04W 72/232; H04W 72/23; H04L 5/0053; H04L 5/001
See application file for complete search history.

(56) References Cited

U.S. PATENT DOCUMENTS

2019/0268971 A1    8/2019  Talarico et al.
2021/0144743 A1*   5/2021  Rastegardoost ...... H04W 72/23
2021/0204282 A1*   7/2021  Lee ................... H04W 72/0446

FOREIGN PATENT DOCUMENTS

WO    2020030555 A1    2/2020
WO    2020030801 A1    2/2020
WO    2020145860 A1    7/2020

OTHER PUBLICATIONS

3GPP, "3rd Generation Partnership Project; Technical Specification Group Radio Access Network; NR; Multiplexing and channel coding (Release 16)", 3GPP TS 38.212 V16.1.0, Mar. 2020, 146 pages.

(Continued)

Primary Examiner — Dady Chery
(74) Attorney, Agent, or Firm — Murphy, Bilak & Homiller, PLLC

(57) ABSTRACT

A wireless device (14) receives a downlink control information message (20) on a physical downlink control channel. In some embodiments, the downlink control information message (20) schedules two or more non-redundant downlink transmissions to be transmitted to the wireless device (14) in respective transmission time intervals, TTIs, on a first downlink serving cell (16A) and one or more non-redundant downlink transmissions to be transmitted to the wireless device (14) in one or more respective TTIs on a second downlink serving cell. In other embodiments, the downlink control information message (20) schedules one or more non-redundant uplink transmissions to be transmitted from the wireless device (14) in one or more respective TTIs (Continued)

on a first uplink serving cell (18A) and one or more non-redundant uplink transmissions to be transmitted from the wireless device (14) in one or more respective TTIs on a second uplink serving cell (18B).

20 Claims, 22 Drawing Sheets

(56) References Cited

OTHER PUBLICATIONS

3GPP, "3rd Generation Partnership Project; Technical Specification Group Radio Access Network; NR; Physical layer procedures for data (Release 16)", 3GPP TS 38.214 V16.1.0, Mar. 2020, 1-151.
Charter Communications, "HARQ Enhancements and UL Scheduling", 3GPP TSG RAN WG1 Meeting #96, R1-1901872, Athens, Greece, Feb. 25-Mar. 1, 2019, 1-3.
Huawei, et al., "Scheduling scheme for slot aggregation", 3GPP TSG RAN WG1 NR Ad-Hoc Meeting, R1-1700026, Spokane, USA, Jan. 16-20, 2017, 1-6.
Nokia, et al., "On cross-carrier scheduling with mixed numerologies", 3GPP TSG RAN WG1 Meeting #96bis, R1-1904720, Xi'an, China, Apr. 8-12, 2019, 1-6.
Oppo, "Remaining issues on GC-PDCCH", 3GPP TSG RAN WG1 Meeting #93, R1-1806858, Busan, Korea, May 21-25, 2018, 1-5.
Qualcomm, "New SID on XR Evaluations for NR", 3GPP TSG RAN Meeting, #86 RP-193241, Sitges, Spain, Dec. 9-12, 2019, 1-6.

\* cited by examiner

TRANSMITTING, ON A PHYSICAL DOWNLINK CONTROL
CHANNEL, A DOWNLINK CONTROL INFORMATION MESSAGE
THAT SCHEDULES TWO OR MORE TRANSMISSIONS
1100

TRANSMITTING OR RECEIVING THE TWO OR MORE
TRANSMISSIONS ACCORDING TO THE RECEIVED DOWNLINK
CONTROL INFORMATION MESSAGE
1110

*FIGURE 11*

TRANSMISSION SCHEDULING IN A WIRELESS COMMUNICATION NETWORK

TECHNICAL FIELD

The present application relates generally to a wireless communication network, and relates more specifically to scheduling of transmissions in such a network.

BACKGROUND

Some types of wireless communication networks, such as those based on $3^{rd}$ Generation Partnership Project (3GPP) standards, transmit downlink control information (DCI) to a wireless device in order to schedule transmissions to or from that wireless device. Conventionally, a DCI message schedules a transmission in a single transmission time interval (TTI), such as a slot or mini-slot. Scheduling transmissions on a single TTI by single TTI basis in this way via physical layer signaling advantageously means scheduling can react quickly to changing channel conditions and fluctuating traffic demands, while maximizing radio resource utilization.

SUMMARY

According to some embodiments herein, a downlink control information message schedules multiple non-redundant transmissions in respective transmission time intervals, TTIs. The message may for instance schedule two or more non-redundant downlink transmissions in respective TTIs on a downlink serving cell, and optionally, one or more non-redundant downlink transmissions in one or more respective TTIs on another downlink serving cell. Or, the message may schedule one or more non-redundant uplink transmissions in respective TTIs on a first uplink serving cell and one or more non-redundant uplink transmissions in one or more respective TTIs on a second uplink serving cell. Regardless, scheduling multiple non-redundant transmissions in this way via a single downlink control information message may prove advantageous for reducing signaling overhead and/or transmission latency under some circumstances, such as for supporting eXtended Reality (XR) or other low-latency high-rate applications that prompt sustained traffic demand.

More particularly, embodiments herein include a method performed by a wireless device. The method comprises receiving, on a physical downlink control channel, a downlink control information message. In some embodiments, the downlink control information message schedules two or more non-redundant downlink transmissions to be transmitted to the wireless device in respective transmission time intervals, TTIs, on a first downlink serving cell of the wireless device. and one or more non-redundant downlink transmissions to be transmitted to the wireless device in one or more respective TTIs on a second downlink serving cell. In other embodiments, the downlink control information message schedules one or more non-redundant uplink transmissions to be transmitted from the wireless device in one or more respective TTIs on a first uplink serving cell of the wireless device and one or more non-redundant uplink transmissions to be transmitted from the wireless device in one or more respective TTIs on a second uplink serving cell of the wireless device.

In some embodiments, the method further comprises receiving the two or more non-redundant downlink transmissions on the first downlink serving cell and the one or more non-redundant downlink transmissions on the second downlink serving cell, or transmitting the one or more non-redundant uplink transmissions on the first uplink serving cell and the one or more non-redundant uplink transmissions on the second uplink serving cell, according to the received downlink control information message.

In some embodiments, the downlink control information message indicates in how many TTIs the two or more non-redundant downlink transmissions are to be transmitted on the first downlink serving cell, and/or in how many TTIs the one or more non-redundant downlink transmissions are to be transmitted on the second downlink serving cell. In other embodiments, the downlink control information message may indicate in how many TTIs the one or more non-redundant uplink transmissions are to be transmitted on the first uplink serving cell, and/or in how many TTIs the one or more non-redundant uplink transmissions are to be transmitted on the second uplink serving cell.

In some embodiments, the downlink control information message includes one or more cell-specific parameters and one or more common parameters. The one or more cell-specific parameters are each specific to a serving cell and common to all non-redundant downlink transmissions or all non-redundant uplink transmissions scheduled by the downlink control information message for transmission on that serving cell. The one or more common parameters are each common to all non-redundant downlink transmissions or all non-redundant uplink transmissions scheduled by the downlink control information message. In one or more of these embodiments, the downlink control information message further includes one or more transmission-specific parameters that are each specific to a certain non-redundant downlink transmission or non-redundant uplink transmission scheduled by the downlink control information message. In one such embodiment, at least one of the one or more transmission-specific parameters explicitly indicates a value for a certain non-redundant downlink transmission or non-redundant uplink transmission scheduled by the downlink control information message, in which case the method may further comprise deriving, from the indicated value, a value for another non-redundant downlink transmission or non-redundant uplink transmission scheduled by the downlink control information message. In any event, in some embodiments, at least one of the one or more transmission-specific parameters is a modulation and coding scheme parameter.

In some embodiments, at least some of the TTIs in which the two or more non-redundant downlink transmissions are to be transmitted on the first downlink serving cell are non-consecutive TTIs. and/or at least some of the one or more TTIs in which the one or more non-redundant downlink transmissions are to be transmitted on the second downlink serving cell are non-consecutive TTIs. In other embodiments, at least some of the one or more TTIs in which the one or more non-redundant uplink transmissions are to be transmitted on the first uplink serving cell are non-consecutive TTIs and/or, at least some of the one or more TTIs in which the one or more non-redundant uplink transmissions are to be transmitted on the second uplink serving cell are non-consecutive TTIs.

In some embodiments, the downlink control information message indicates a TTI offset separately for each of the two or more non-redundant downlink transmissions on the first downlink serving cell, for each of the one or more non-redundant downlink transmissions on the second downlink serving cell, for each of the one or more non-redundant uplink transmissions on the first uplink serving cell, or for each of the one or more non-redundant uplink transmissions on the second uplink serving cell, where the TTI offset is an offset between a TTI in which the downlink control information message is received and a TTI in which a transmission is to be transmitted.

In some embodiments, the downlink control information message includes a time allocation bitmap that indicates in which TTIs the two or more non-redundant downlink transmissions are to be transmitted on the first downlink serving cell, the one or more non-redundant downlink transmissions are to be transmitted on the second downlink serving cell, the one or more non-redundant uplink transmissions are to be transmitted on the first uplink serving cell, or the one or more non-redundant uplink transmissions are to be transmitted on the second uplink serving cell, where different bits in the time allocation bitmap indicate whether or not a non-redundant downlink transmission or a non-redundant uplink transmission is to be transmitted in different respective TTIs included in a set of TTIs.

In some embodiments, the downlink control information message has a certain message format, and wherein the method further comprises receiving control plane signaling that configures whether and/or how the wireless device is to attempt to decode received downlink control information messages according to the certain message format.

In some embodiments, the downlink control information message schedules the two or more non-redundant downlink transmissions to be transmitted to the wireless device in the two or more respective TTIs on the first downlink serving cell of the wireless device. In one such embodiment, the downlink control information message also schedules the one or more non-redundant downlink transmissions to be transmitted to the wireless device in the one or more respective TTIs on the second downlink serving cell of the wireless device.

In some embodiments, the downlink control information message schedules the one or more non-redundant uplink transmissions to be transmitted from the wireless device in respective TTIs on the first uplink serving cell of the wireless device and the one or more non-redundant uplink transmissions to be transmitted from the wireless device in the one or more respective TTIs on the second uplink serving cell of the wireless device. In one such embodiment, the one or more non-redundant uplink transmissions scheduled by the downlink control information to be transmitted from the wireless device in one or more respective TTIs on the first uplink serving cell of the wireless device comprise two or more non-redundant uplink transmissions, and/or the one or more non-redundant uplink transmissions scheduled by the downlink control information to be transmitted from the wireless device in one or more respective TTIs on the second uplink serving cell of the wireless device comprise two or more non-redundant uplink transmissions.

In some embodiments, a TTI is a number of Orthogonal Frequency Division Multiplexing, OFDM, symbols over which a non-redundant downlink transmission or a non-redundant uplink transmission spans.

In some embodiments, each of the two or more non-redundant downlink transmissions on the first downlink serving cell, and each of the one or more non-redundant downlink transmissions on the second downlink serving cell carries data from the same application layer file. In other embodiments, each of the one or more non-redundant uplink transmissions on the first uplink serving cell, and each of the one or more non-redundant uplink transmissions on the second uplink serving cell, carries data from the same application layer file.

Embodiments herein also include a method performed by a radio network node. The method comprises transmitting, on a physical downlink control channel to a wireless device, a downlink control information message. In some embodiments, the downlink control information message schedules two or more non-redundant downlink transmissions to be transmitted to the wireless device in respective transmission time intervals, TTIs, on a first downlink serving cell of the wireless device and one or more non-redundant downlink transmissions to be transmitted to the wireless device in one or more respective TTIs on a second downlink serving cell of the wireless device. In other embodiments, the downlink control information message schedules one or more non-redundant uplink transmissions to be transmitted from the wireless device in one or more respective TTIs on a first uplink serving cell of the wireless device and one or more non-redundant uplink transmissions to be transmitted from the wireless device in one or more respective TTIs on a second uplink serving cell of the wireless device.

In some embodiments, the method further comprises transmitting the two or more non-redundant downlink transmissions on the first downlink serving cell, and/or the one or more non-redundant downlink transmissions on the second downlink serving cell, or receiving the one or more non-redundant uplink transmissions on the first uplink serving cell and the one or more non-redundant uplink transmissions on the second uplink serving cell, according to the received downlink control information message.

In some embodiments, the downlink control information message indicates in how many TTIs the two or more non-redundant downlink transmissions are to be transmitted on the downlink serving cell, and/or in how many TTIs the one or more non-redundant downlink transmissions are to be transmitted on the second downlink serving cell. In other embodiments, the downlink control information message indicates in how many TTIs the one or more non-redundant uplink transmissions are to be transmitted on the first uplink serving cell, and/or in how many TTIs the one or more non-redundant uplink transmissions are to be transmitted on the second uplink serving cell.

In some embodiments, the downlink control information message includes one or more cell-specific parameters and one or more common parameters. The one or more cell-specific parameters are each specific to a serving cell and common to all non-redundant downlink transmissions or all non-redundant uplink transmissions scheduled by the downlink control information message for transmission on that serving cell. The one or more common parameters are each common to all non-redundant downlink transmissions or all non-redundant uplink transmissions scheduled by the downlink control information message. In some embodiments, the downlink control information message further includes one or more transmission-specific parameters that are each specific to a certain non-redundant downlink transmission or non-redundant uplink transmission scheduled by the downlink control information message. In one such embodiment, at least one of the one or more transmission-specific parameters explicitly indicates a value for a certain non-redundant downlink transmission or non-redundant uplink transmission scheduled by the downlink control information message, and implicitly indicates a value for another non-redundant downlink transmission or non-redundant uplink transmission scheduled by the downlink control information message. In any event, in some embodiments, at least one of the one or more transmission-specific parameters is a modulation and coding scheme parameter.

In some embodiments, at least some of the TTIs in which the two or more non-redundant downlink transmissions are to be transmitted on the first downlink serving cell are non-consecutive TTIs, and/or at least some of the one or more TTIs in which the one or more non-redundant downlink transmissions are to be transmitted on the second downlink serving cell are non-consecutive TTIs. In other embodiments, at least some of the one or more TTIs in which the one or more non-redundant uplink transmissions are to be transmitted on the first uplink serving cell are non-consecutive TTIs, and/or at least some of the one or more TTIs in which the one or more non-redundant uplink transmissions are to be transmitted on the second uplink serving cell are non-consecutive TTIs.

In some embodiments, the downlink control information message indicates a TTI offset separately for each of the two or more non-redundant downlink transmissions on the first downlink serving cell, for each of the one or more non-redundant downlink transmissions on the second downlink serving cell, for each of the one or more non-redundant uplink transmissions on the first uplink serving cell, or for each of the one or more non-redundant uplink transmissions on the second uplink serving cell, where the TTI offset is an offset between a TTI in which the downlink control information message is transmitted and a TTI in which a transmission is to be transmitted.

In some embodiments, the downlink control information message includes a time allocation bitmap that indicates in which TTIs the two or more non-redundant downlink transmissions are to be transmitted on the first downlink serving cell, the one or more non-redundant downlink transmissions are to be transmitted on the second downlink serving cell, the one or more non-redundant uplink transmissions are to be transmitted on the first uplink serving cell, or the one or more non-redundant uplink transmissions are to be transmitted on the second uplink serving cell, where different bits in the time allocation bitmap indicate whether or not a non-redundant downlink transmission or a non-redundant uplink transmission is to be transmitted in different respective TTIs included in a set of TTIs.

In some embodiments, the downlink control information message has a certain message format. In this case, the method may further comprise transmitting control plane signaling that configures whether and/or how the wireless device is to attempt to decode received downlink control information messages according to the certain message format.

In some embodiments, the downlink control information message schedules the two or more non-redundant downlink transmissions to be transmitted to the wireless device in the two or more respective TTIs on the first downlink serving cell of the wireless device. In one such embodiment, the downlink control information message also schedules the one or more non-redundant downlink transmissions to be transmitted to the wireless device in the one or more respective TTIs on the second downlink serving cell of the wireless device.

In other embodiments, the downlink control information message schedules the one or more non-redundant uplink transmissions to be transmitted from the wireless device in one or more respective TTIs on the first uplink serving cell of the wireless device and the one or more non-redundant uplink transmissions to be transmitted from the wireless device in the one or more respective TTIs on the second uplink serving cell of the wireless device. In one such embodiment, the one or more non-redundant uplink transmissions scheduled by the downlink control information to be transmitted from the wireless device in one or more respective TTIs on the first uplink serving cell of the wireless device comprise two or more non-redundant uplink transmissions, and/or the one or more non-redundant uplink transmissions scheduled by the downlink control information to be transmitted from the wireless device in one or more respective TTIs on the second uplink serving cell of the wireless device comprise two or more non-redundant uplink transmissions.

In some embodiments, a TTI is a number of Orthogonal Frequency Division Multiplexing, OFDM, symbols over which a non-redundant downlink transmission or a non-redundant uplink transmission spans.

In some embodiments, each of the two or more non-redundant downlink transmissions on the first downlink serving cell, and each of the one or more non-redundant downlink transmissions on the second downlink serving cell, carries data from the same application layer file. In other embodiments, each of the one or more non-redundant uplink transmissions on the first uplink serving cell, and each of the one or more non-redundant uplink transmissions on the second uplink serving cell, carries data from the same application layer file.

Embodiments herein also include corresponding apparatus, computer programs, and carriers of those computer programs. For example, embodiments herein include a wireless device, e.g., comprising communication circuitry and processing circuitry. The wireless device is configured to receive, on a physical downlink control channel, a downlink control information message. In some embodiments, the downlink control information message schedules two or more non-redundant downlink transmissions to be transmitted to the wireless device in respective transmission time intervals, TTIs, on a first downlink serving cell of the wireless device and one or more non-redundant downlink transmissions to be transmitted to the wireless device in one or more respective TTIs on a second downlink serving cell of the wireless device. In other embodiments, the downlink control information message schedules one or more non-redundant uplink transmissions to be transmitted from the wireless device in one or more respective TTIs on a first uplink serving cell of the wireless device and one or more non-redundant uplink transmissions to be transmitted from the wireless device in one or more respective TTIs on a second uplink serving cell of the wireless device.

In some embodiments, the wireless device is configured to perform the steps described above for a wireless device.

Embodiments herein also include a radio network node, e.g., comprising communication circuitry and processing circuitry. The radio network node is configured to transmit, on a physical downlink control channel to a wireless device, a downlink control information message. In some embodiments, the downlink control information message schedules two or more non-redundant downlink transmissions to be transmitted to the wireless device in respective transmission time intervals, TTIs, on a first downlink serving cell of the wireless device and one or more non-redundant downlink transmissions to be transmitted to the wireless device in one or more respective TTIs on a second downlink serving cell of the wireless device. In other embodiments, the downlink control information message schedules one or more non-redundant uplink transmissions to be transmitted from the wireless device in one or more respective TTIs on a first uplink serving cell of the wireless device and one or more non-redundant uplink transmissions to be transmitted from the wireless device in one or more respective TTIs on a second uplink serving cell of the wireless device.

In some embodiments, the radio network node is configured to perform the steps described above for a radio network node.

Other embodiments herein include a computer program comprising instructions which, when executed by at least one processor of a wireless device, causes the wireless device to perform the steps described above for a wireless device. Other embodiments herein include a computer program comprising instructions which, when executed by at least one processor of a radio network node, causes the radio network node to perform the steps described above for a radio network node. In one or more of these embodiments, a carrier containing the computer program described above is one of an electronic signal, optical signal, radio signal, or computer readable storage medium.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 11 is a logic flow diagram of a method performed by a radio network node according to some embodiments.

DETAILED DESCRIPTION

Figure 1:
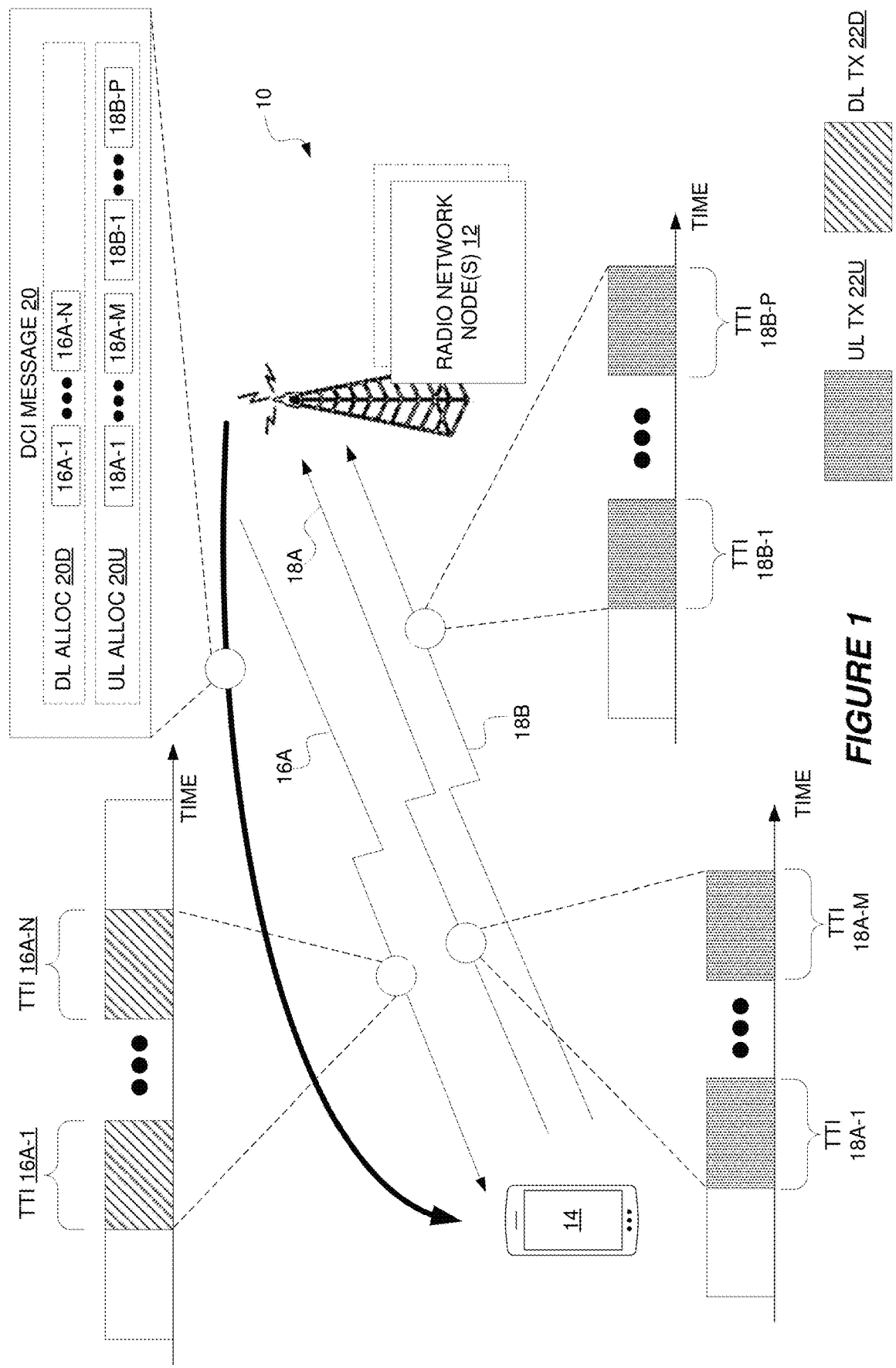
FIG. 1 is block diagram of a wireless communication network according to some embodiments.

FIG. 1 shows a wireless communication network 10 according to some embodiments. The wireless communication network 10 includes one or more radio network nodes 12 that serve a wireless device 14, e.g., over a radio interface. The radio network node(s) 12 in this regard provide one or more serving cells on which transmissions to or from the wireless device 14 may be performed.

As shown, for instance, the radio network node(s) 12 provide a first downlink serving cell 16A on which downlink (DL) transmissions (TXs) may be transmitted to the wireless device 14 and/or provide a first uplink serving cell 18A on which uplink (UL) transmissions may be transmitted from the wireless device 14. In some embodiments, such as those based on Time Division Duplexing (TDD), the first downlink serving cell 16A and the first uplink serving cell 18A are the same serving cell, with UL and DL transmissions separated from one another on that serving cell, e.g., in a time, space, or code domain. In other embodiments, such as those based on Frequency Division Duplexing (FDD), the first downlink serving cell 16A and the first uplink serving cell 18A are different serving cells. In either case, the radio network node(s) 12 may nonetheless provide one or more additional downlink serving cells (not shown) and/or one or more additional uplink serving cells. As shown, for instance, the radio network node(s) 12 also provide a second uplink serving cell 18B on which UL transmissions may be transmitted from the wireless device 14 as well.

In any event, the radio network node(s) 12 control the scheduling of transmissions (e.g., unicast transmissions) to or from the wireless device 14 on a serving cell. Transmission scheduling is performed on a transmission time interval (TTI) basis, where a TTI is the smallest scheduling unit defined for transmission scheduling on a certain serving cell, i.e., the smallest interval of time during which a transmission can be scheduled on a certain serving cell. In some embodiments, for instance, scheduling is performed on a time slot basis such that a TTI corresponds to a time slot, e.g., where a time slot occupies either 12 or 14 Orthogonal Frequency Division Multiplexing (OFDM) symbols. In a New Radio (NR) network, a time slot may be one of $2^\mu$ slots in a subframe, where $\mu=0, 1, 2, 3$ for the subcarrier spacing of $15 \times 2^\mu$ kHz, respectively, and where each frame of 10 ms consists of 10 subframes. Nonetheless, although a slot is a typical unit for radio resource allocation in NR, NR may also enable a transmission to start at any OFDM symbol and last only as many symbols as needed. In other embodiments in this regard, scheduling is performed on a mini-slot basis such that a TTI corresponds to a mini-slot, e.g., where a mini-slot occupies 2, 4, or 7 OFDM symbols. In either case, then, the TTI may be or correspond to the number of OFDM symbols over which a transmission spans. Alternatively or additionally, the transmission in a TTI may in some embodiments carry or otherwise correspond to one or more transport blocks, e.g., at a Medium Access Control (MAC) layer. In these and other embodiments, the transmission in a TTI may be a transmission at a physical layer and/or on a physical layer channel. Where the physical layer channel is a Physical Downlink Shared Channel (PDSCH), for instance, a downlink transmission may be a PDSCH transmission. Where the physical layer channel is a Physical Uplink Shared Channel (PUSCH) by contrast, an uplink transmission may be a PUSCH transmission. No matter the particular length of a TTI or the nature of the transmission in that TTI, though, transmission scheduling as controlled by the radio network node(s) 12 involves signaling to the wireless device 14 which TTI(s) are allocated for transmission(s) to or from the wireless device 14. Such signaling may be realized with downlink control information (DCI) messaging, e.g., on a physical layer control channel such as a Physical Downlink Control Channel (PDCCH).

According to some embodiments in this regard, a single DCI message is notably configurable to schedule multiple transmissions in respective TTIs, as opposed to being limited to scheduling a single transmission in a single TTI. In some embodiments, two or more of the multiple transmissions scheduled by the single DCI message are to be transmitted on the same serving cell. In other embodiments, one or more of the multiple transmissions scheduled by the single DCI message are to be transmitted on one serving cell and one or more others of the multiple transmissions scheduled by the single DCI message are to be transmitted on another serving cell.

FIG. 1 more particularly shows a DCI message 20 that may be transmitted to the wireless device 14 according to embodiments herein. The DCI message 20 may be referred to for convenience as a "master DCI" or a "master DCI message". As one example, the DCI message 20 in some embodiments schedules N downlink transmissions 22D to be transmitted to the wireless device 14 in respective TTIs 16A-1 . . . 16A-N on the first downlink serving cell 16A, where N≥2. The DCI message 20 may for instance include a DL time allocation 20D that indicates allocation of TTIs 16A-1 . . . 16A-N to the wireless device 14, e.g., where one DL transmission is to be transmitted in each of the N allocated TTIs. The DCI message 20 in these and other embodiments may indicate in how many TTIs the downlink transmissions 22D are to be transmitted, e.g., by explicitly or implicitly indicating the value of N. In some embodiments, the DCI message 20 is transmitted to the wireless device 14 on the first downlink serving cell 16A as well. In other embodiments, though, the DCI message 20 is transmitted to the wireless device 14 on a different serving cell, e.g., by employing cross-carrier scheduling. Alternatively or additionally, although not shown, the DCI message 20 in other embodiments may also schedule one or more DL transmissions 22D to be transmitted to the wireless device 14 in one or more respective TTIs on a second downlink serving cell of the wireless device 14.

As another example, the DCI message 20 in other embodiments schedules M uplink transmissions 22U to be transmitted from the wireless device 14 in respective TTIs 18A-1 . . . 18A-M on the first uplink serving cell 18A, where M≥1, and also schedules P uplink transmissions 22U to be transmitted from the wireless device 14 in respective TTIs 18B-1 . . . 18B-P on the second uplink serving cell 18B, where P≥1. The DCI message 20 may for instance include an UL time allocation 20U that indicates allocation of one or more TTIs 18A-1 . . . 18A-M to the wireless device 14 on the first uplink serving cell 18A and allocation of one or more TTIs 18B-1 . . . 18B-P to the wireless device 14 on the second uplink serving cell 18B, e.g., where one UL transmission is to be transmitted in each of the M allocated TTIs on the first uplink serving cell 18A and in each of the P allocated TTIs on the second uplink serving cell 18B. The DCI message 20 in these and other embodiments may indicate in how many TTIs the one or more uplink transmissions 22U are to be transmitted on the first uplink serving cell 18A and/or in how many TTIs the one or more uplink transmissions 22U are to be transmitted on the second uplink serving cell 18B, e.g., by explicitly or implicitly indicating the value of M and/or the value of P.

Figure 2:
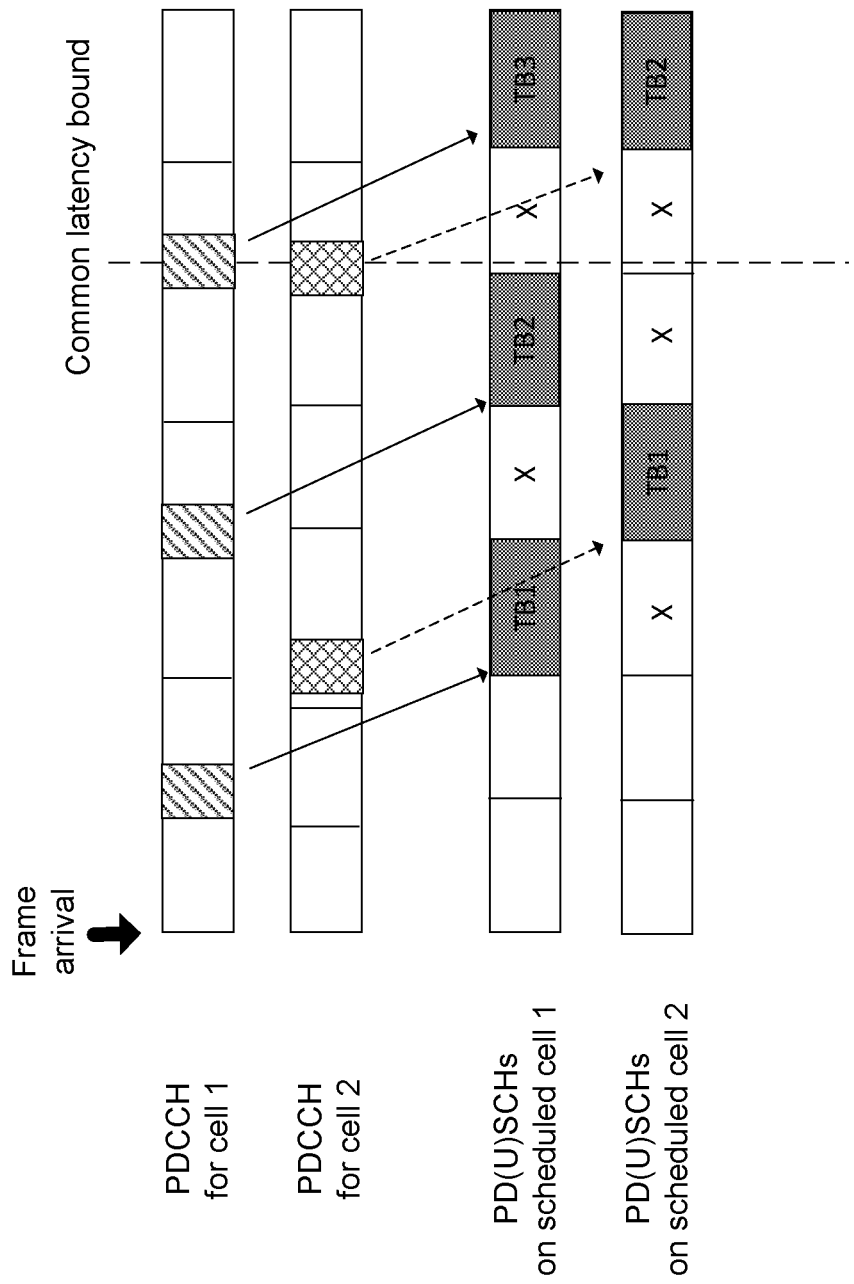
FIG. 2 is a block diagram of a latency bound miss that is avoided by some embodiments herein.

Regardless of whether the DCI message 20 schedules transmissions in the UL and/or DL, scheduling multiple transmissions in this way via a single DCI message 20 may prove advantageous for reducing signaling overhead and/or transmission latency. Indeed, scheduling multiple transmissions via a single DCI message requires fewer radio resources and/or less delay (e.g., lower overall delivery time over the radio access network) than scheduling those same transmissions via multiple DCI messages, one for each transmission. The reduction in radio resources may be attributable to reducing extra overhead that would otherwise be required to signal repeated DCI messages to the same wireless device. Radio resource reduction may thereby lower the risk of control channel blocking (e.g., PDCCH blocking) and improve the likelihood of meeting bounded latency requirements. Moreover, the lowered delay may be attributable to avoiding the delay from having to schedule other traffic to/from the same wireless device or other wireless devices between the multiple DCI messages, and/or attributable to preventing retransmission delay that would otherwise be required if some of those multiple DCI messages were to have transmission errors. FIG. 2 for instance shows one example avoided by some embodiments herein, whereby the latency bound is missed because a per-slot DCI message adds extra video frame-level latency. Note here that 'x' represents scheduled slots for other users/services and the PDCCH can be sent from the same cell or a different cell.

In fact, in these and other embodiments, scheduling multiple transmissions via a single DCI message may still maximize radio resource utilization when used for supporting sustained traffic demand, such as may occur for XR or other low-latency high-rate services or applications, e.g., that require timely aggregated radio resource allocation in the time and/or frequency domain. That is, when a single DCI message is used to schedule multiple transmissions in respective TTIs, those TTIs are likely to be utilized well (not wasted) if those multiple transmissions carry data for a service or application whose traffic demands are sustained over time, as opposed to carrying data for a service or application whose traffic demands are bursty over time. The multiple transmissions scheduled by the DCI message 20 may for example carry data from or otherwise corresponding to the same application layer file, e.g., from the same video file which may include large video frames. Generally, then, a single DCI message may timely allocate multiple TTIs, across serving cells, or a combination thereof, in order to deliver multiple transmissions corresponding to one application file, e.g., a video frame.

Figure 3:
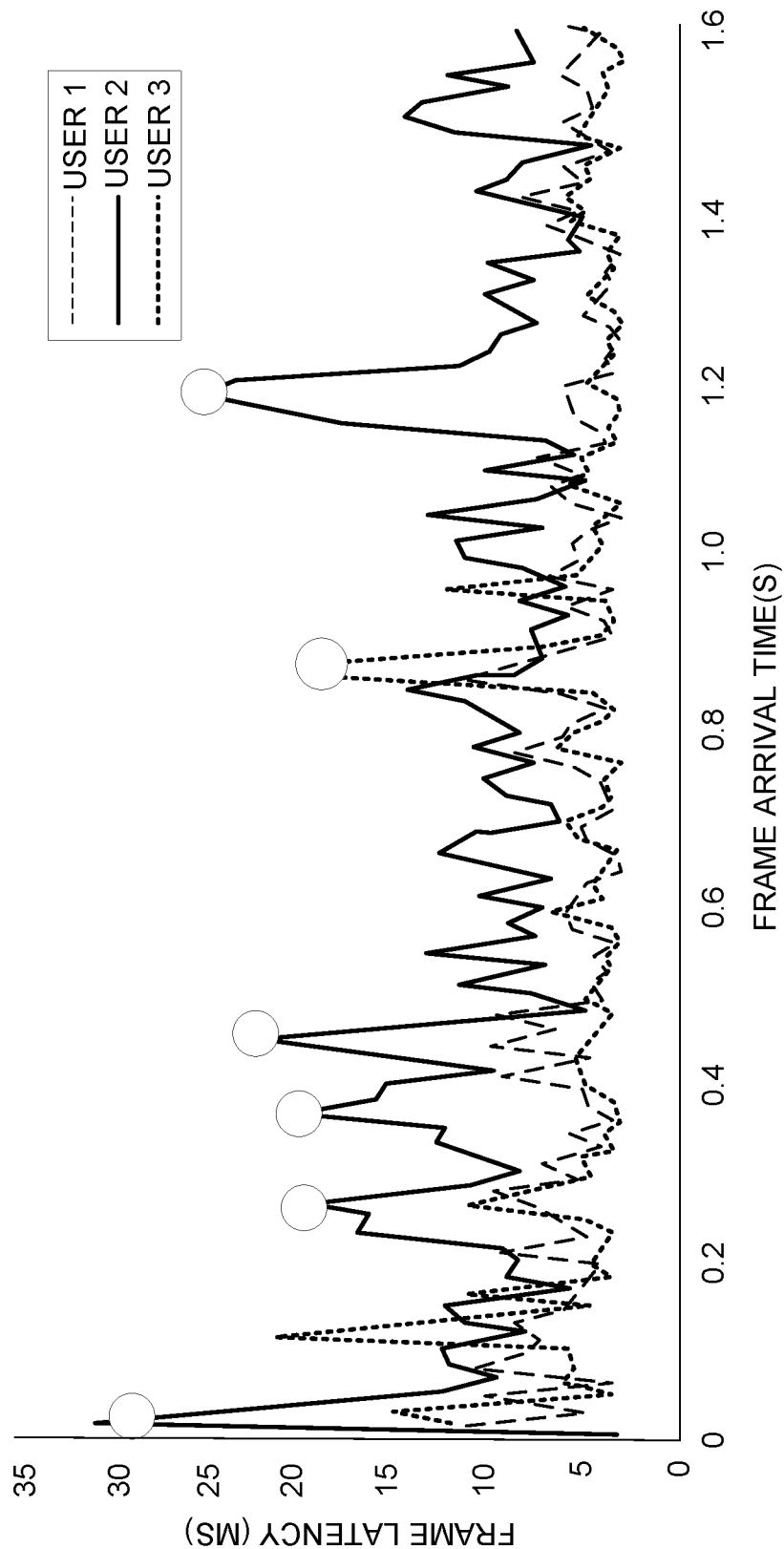
FIG. 3 is a graph of frame latency spikes in a radio access network heretofore.
Figure 4:
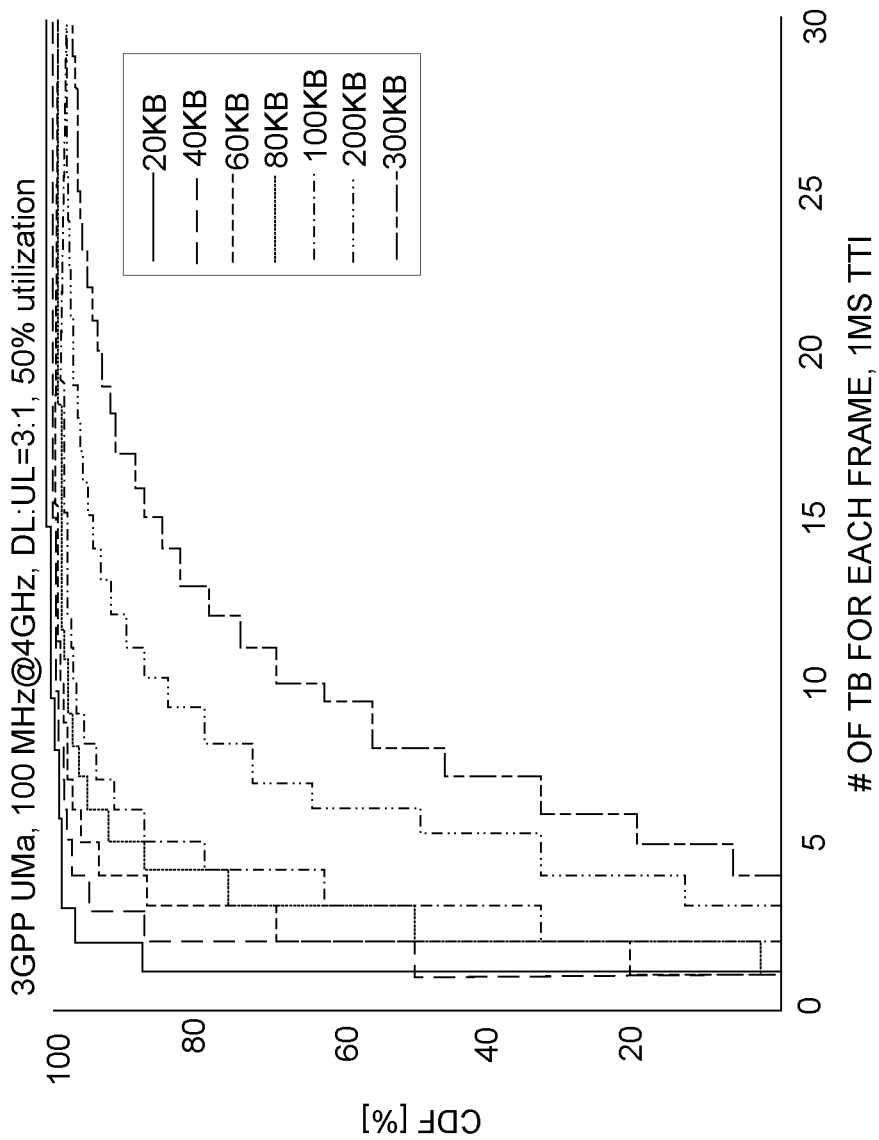
FIG. 4 is a graph of a cumulative distribution function of a number of transport blocks required to deliver a video frame according to some embodiments.

Some embodiments therefore may be particularly applicable for applications like eXtended reality (XR) and cloud gaming that require long scheduled transmission bursts, bounded latency, and/or high-rate transmissions. XR may refer to all real-and-virtual combined environments and human-machine interactions generated by computer technology and wearables, e.g., to generally refer to different types of realities, including Virtual Reality (VR), Augmented Reality (AR), Mixed Reality (MR), and the areas interpolated among them so as to range from partially sensory inputs to fully immersive VR. In these and other cases, the end-to-end latency budget may be in the range of 20-80 ms, which needs to be distributed over several components including application processing latency, transport latency, radio link latency, etc. For these applications, short TTIs alone may not be effective in mitigating latency spikes attributes to queueing delay, time-varying radio resources, time-varying frame sizes, among others. FIG. 3 shows one example of frame latency measured over the radio access network heretofore (excluding application and core network latencies), demonstrating latency spikes that occur due to instantaneous shortages of radio resources or insufficient radio resource allocation in response to varying frame size. In addition, the high-rate transmissions may be attributable in these cases to large frame sizes, e.g., ranging from tens of kilobytes to hundreds of kilobytes, with a frame arrival rates of 60 to 120 frames per second. As a concrete example, a frame size of 100 kilobytes and a frame arrival rate of 120 frames per second can lead to a rate requirement of 95.8 Mbps. In these and other examples, then, the number of transport blocks (TBs) required to deliver a large application layer payload (e.g., of 20 KB to 300 KB) may range from 1 to 30, e.g., delivering video frames with a size of 100 KB each may require a median of 5 TBs. FIG. 4 in this regard shows one example of the cumulative distribution function of the number of transport blocks required to deliver a video frame with a size ranging from 20 KB to 300 KB.

In these and other embodiments, at least some of the multiple transmissions scheduled by the DCI message 20 may be non-redundant transmissions. As used herein, a non-redundant transmission conveys data that is not redundant of the data conveyed by another non-redundant transmission. This means non-redundant transmissions do not convey repetitions of the same underlying data, e.g., for coverage enhancement. Nor do non-redundant transmissions convey different redundancy versions of the same underlying data, e.g., where Chase combining or other incremental redundancy approaches are used. Transmission scheduling according to some embodiments herein may thereby advantageously enable increased data throughput by enabling new data to be conveyed in each TTI.

In some embodiments the two or more TTIs 16A-1 . . . 16A-N in which downlink transmissions 22D are scheduled on the first downlink serving cell 16A are consecutive TTIs. Or, the one or more TTIs 18A-1 . . . 18A-M in which uplink transmissions 22U are scheduled on the first uplink serving cell 18A are one or more consecutive TTIs and/or the one or more TTIs 18B-1 . . . 18B-P in which uplink transmissions 22U are scheduled on the second uplink serving cell 18B are one or more consecutive TTIs. In these and other embodiments that schedule transmission in consecutive TTIs, the DCI message 20 may efficiently indicate the TTI occurring first in time and then simply indicate the number of consecutive TTIs in which transmissions are to be scheduled.

The DCI message 20 in other embodiments by contrast schedule at least some transmissions to be transmitted in non-consecutive TTIs. For example, in some embodiments, at least some of the TTIs 16A-1 . . . 16A-N in which the two or more downlink transmissions 22D are to be transmitted on the first downlink serving cell 16A are non-consecutive, i.e., the DCI message 20 does not schedule any downlink transmission 22D to be transmitted on the first downlink serving cell 16A in at least one intervening TTI that occurs within the span of TTIs that are allocated by the DCI message 20. As another example, in some embodiments where the DCI message 20 schedules two or more uplink transmissions 22U in respective TTIs 18A-1 . . . 18A-M on the first uplink serving cell 18A, at least some of those TTIs 18A-1 . . . 18A-M may be non-consecutive. Alternatively or additionally, in some embodiments where the DCI message 20 schedules two or more uplink transmissions 22U in respective TTIs 18B-1 . . . 18B-P on the second uplink serving cell 18B, at least some of those TTIs 18B-1 . . . 18B-P may be non-consecutive.

Figure 5:
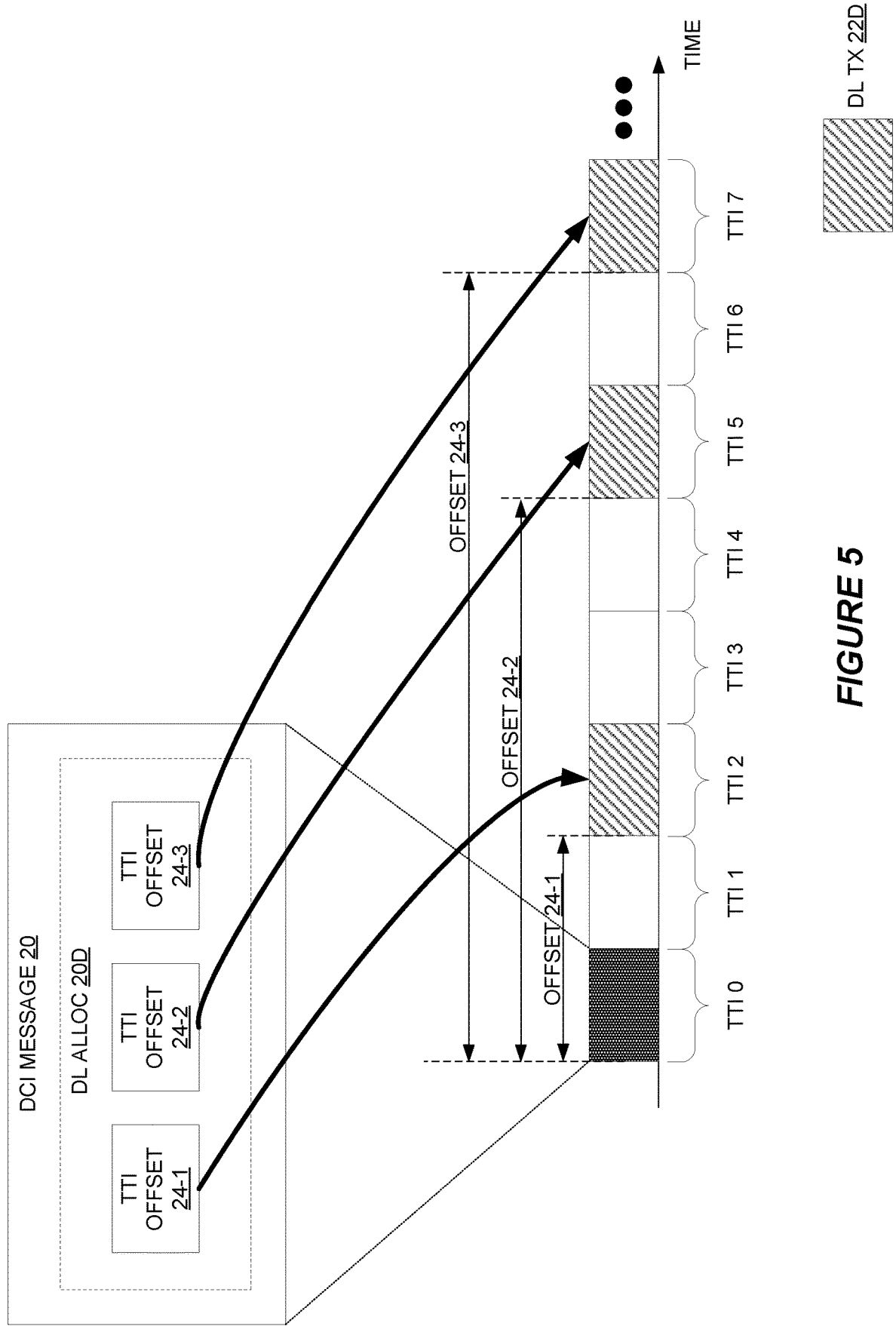
FIG. 5 is a block diagram of a downlink control information message according to some embodiments.

In one or more embodiments, the DCI message 20 schedules transmissions in non-consecutive TTIs by indicating a TTI offset for each scheduled transmission. Such a TTI offset may indicate an offset between the TTI in which the DCI message 20 is transmitted/received and the TTI in which a transmission is to be transmitted. By indicating separate TTI offsets for each transmission, the DCI message 20 may thereby indicate non-consecutive TTIs in which transmissions are to be transmitted. FIG. 5 shows one example for a DCI message 20 that schedules downlink transmissions 22D.

As shown in FIG. 5, the DCI message 20 is transmitted to the wireless device in TTI 0. The DCI message 20 schedules three DL transmissions 22D to be transmitted in respective TTIs that occur non-consecutively in time; namely, in TTIs 2, 5, and 7. The DCI message 20 in this regard does not schedule any DL transmission 22D to be transmitted in any intervening TTI; namely, in intervening TTIs 1, 3, 4, and 6. To signal this, the DCI message 20 indicates a TTI offset separately for each of the three scheduled DL transmissions 22D. In particular, the DCI message 20 indicates a TTI offset 24-1 of "2" for a DL transmission 22D to be transmitted in TTI 2, because the offset between the TTI 0 in which the DCI message 20 is transmitted/received and between the TTI 2 in which the DL transmission 22D is to be transmitted is "2". Similarly, the DCI message 20 indicates a TTI offset 24-2 of "5" for a DL transmission 22D to be transmitted in TTI 5, and indicates a TTI offset 24-3 of "7" for a DL transmission 22D to be transmitted in TTI 7.

In embodiments where the wireless communication network 10 adheres to 3GPP standards and a DL transmission 22D is a PDSCH transmission, a TTI offset may correspond to a K0 parameter for indicating a TTI in which a PDSCH transmission is to be transmitted. In this case, the DCI message 20 may configure a downlink time domain resource allocation table with a list of K0 parameter values, with each value in the list corresponding to a scheduled PDSCH transmission. The DCI message 20 thereby indicates K0 parameter values separately for each scheduled PDSCH transmission.

In other embodiments where the wireless communication network 10 adheres to 3GPP standards and an UL transmission 22U is a PUSCH transmission, a TTI offset may correspond to a K2 parameter for indicating a TTI in which a PUSCH transmission is to be transmitted. In this case, the DCI message 20 may configure an uplink time domain resource allocation table with a list of K2 parameter values, with each value in the list corresponding to a scheduled PUSCH transmission. The DCI message 20 thereby indicates K2 parameter values separately for each scheduled PUSCH transmission.

Figure 6:
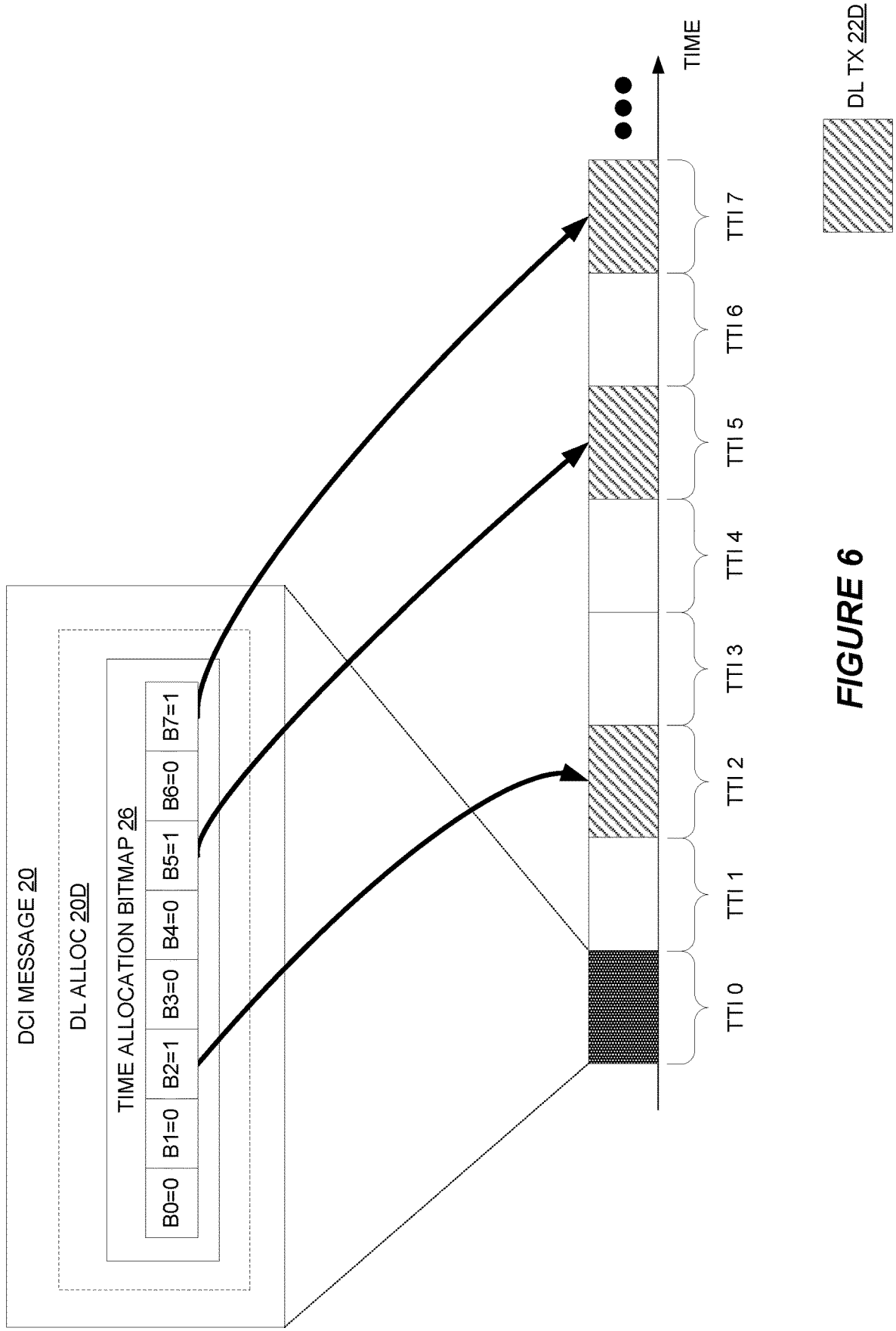
FIG. 6 is a block diagram of a downlink control information message according to other embodiments.

In other embodiments, the DCI message 20 includes one or more time allocation bitmaps that indicate in which TTI(s) transmission(s) are to be transmitted. Different bits in a time allocation bitmap may for instance indicate whether or not a transmission is to be transmitted in different respective TTIs, e.g., included in a set of TTIs covered by the bitmap. Different time allocation bitmaps may be included for different serving cells of the wireless device, e.g., one time allocation bitmap per serving cell. FIG. 6 shows an example for DL transmissions on a certain serving cell.

As shown in FIG. 6, the DCI message 20 is transmitted in TTI 0 and includes a time allocation bitmap 26. The time allocation bitmap 26 includes 8 bits covering a set of TTIs that includes TTI 0 to TTI 7. Bit B0 in this example indicates whether or not a transmission is to be transmitted in TTI 0, i.e., the same TTI in which the DCI message 20 is transmitted. Bit B1 indicates whether or not a transmission is to be transmitted in TTI 1, bit B2 indicates whether or not a transmission is to be transmitted in TTI 2, and so on, such that bit Bx indicates whether or not a transmission is to be transmitted in TTI x. To schedule transmissions selectively in TTIs 2, 5, and 7, then, the time allocation bitmap 26 includes bits B2, B5, and B7 set to 1, with all other bits set to 0, i.e., the bitmap is '00100101'.

In alternative embodiments not shown, bit0in the time allocation bitmap indicates whether or not a transmission is to be transmitted in TTI n+k. Here, TTI n is the TTI in which the DCI message 20 is transmitted, and k is the offset between that TTI and the TTI in which the earliest transmission scheduled by the DCI message 20 is to be transmitted, e.g., $K_0$ for DL and $K_2$ for UL in the example embodiments above. With the bitmap starting at TTI n+k, then, bit B0 would indicate whether or not a transmission is to be transmitted in TTI n+k, bit B1 would indicate whether or not a transmission is to be transmitted in TTI n+k+1, and so on, such that bit Bx would indicate whether or not a transmission is to be transmitted in TTI n+k+x. Modifying the example in FIG. 6 to account for this, the first two bits B0 and B1 of the time allocation bitmap would be dropped, such that the bitmap would be '100101'.

In these and other embodiments, a time allocation bitmap of X bits indicates in which of X consecutive TTIs transmissions are to be transmitted. These embodiments may prove particularly applicable to paired spectrum with FDD operation, e.g., since every TTI may be usable for UL or DL alike. Other embodiments, such as in unpaired spectrum with TDD operation, account for the fact that some TTIs may only be valid for UL transmission, some TTIs may only be valid for DL transmission, and/or some TTIs may flexibly be valid for either UL or DL transmission, e.g., according to a TDD pattern.

In one such embodiment, a radio network node 12 accounts for TTI validity in the way that the radio network node 12 sets the values of bits in a time allocation bitmap, and/or the wireless device 14 accounts for TTI validity in its processing of a time allocation bitmap. For example, the radio network node 12 may set the bit values of a time allocation bitmap to avoid indicating a transmission is to be transmitted in a TTI which is invalid for that transmission, e.g., avoid indicating a DL transmission is to be transmitted in a TTI which is valid only for UL transmission. Similarly, the wireless device 14 may process a time allocation bitmap with the expectation that the bit values do not indicate a transmission is to be transmitted in a TTI which is invalid for that transmission. The wireless device 14 may for instance skip or ignore bit values corresponding to UL-only TTIs when processing a time allocation bitmap for DL transmissions. Or, the wireless device 14 may throw an exception if a bit value corresponding to an UL-only TTI indicates a DL transmission is to be transmitted in that TTI. The wireless device 14 may for example discard such a DCI message 20 that is erroneous or inconsistent with expectations.

Figure 7:
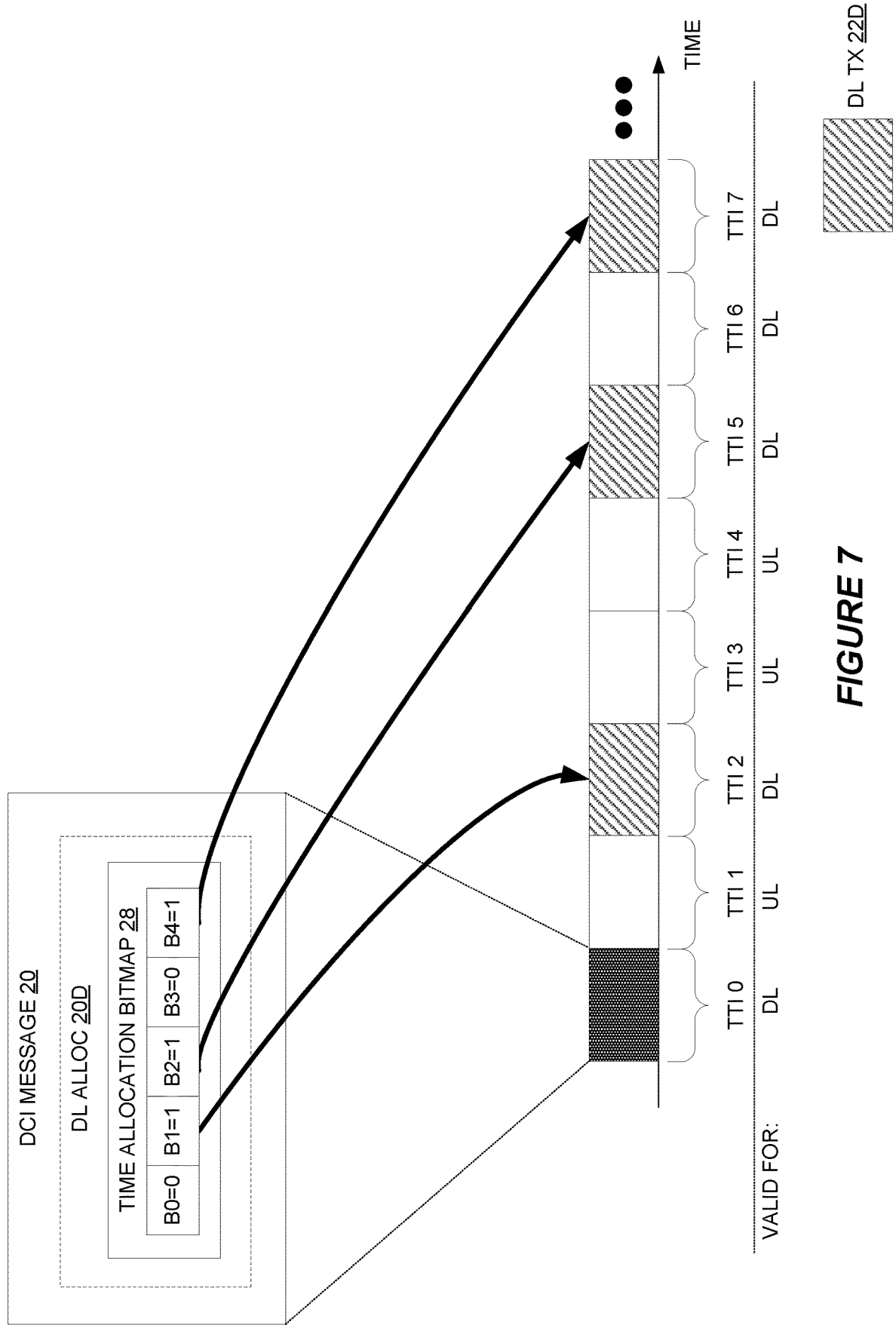
FIG. 7 is a block diagram of a downlink control information message according to still other embodiments.

In other embodiments, a radio network node 12 accounts for TTI validity by generating a time allocation bitmap to selectively include bits for valid TTIs, to the exclusion of invalid TTIs. For example, a time allocation bitmap of X bits may indicate in which X TTIs DL transmissions are to be transmitted, but those X TTIs selectively include only the next X TTIs that are valid TTIs for DL transmissions, i.e., they do not include any TTIs that are only valid for UL transmissions. The time allocation bitmap thereby indicates in which of the X consecutive valid TTIs transmissions are to be transmitted. This advantageously reduces the number of bits needed in the time allocation bitmap. FIG. 7 shows one example for DL transmissions.

As shown in FIG. 7, the DCI message 20 is transmitted in TTI 0 and includes a time allocation bitmap 28 for allocating TTIs for DL transmissions. The time allocation bitmap 28 includes 5 bits. Bit B0 in this example indicates whether or not a transmission is to be transmitted in TTI 0, i.e., the same TTI in which the DCI message 20 is transmitted. The following bits each indicate whether or not a DL transmission is to be transmitted in the next TTI that is valid for a DL transmission. Accordingly, since the next TTIs valid in this example for DL transmissions are TTIs 2, 5, 6, and 7, bits B1, B2, B3, and B4 indicate whether or not a DL transmission is to be transmitted in TTIs 2, 5, 6, and 7, respectively. To schedule transmissions selectively in TTIs 2, 5, and 7, then, the time allocation bitmap 28 includes bits B1, B2, and B4 set to 1, with all other bits set to 0.

No matter the particular configuration or format of a time allocation bitmap, though, such bitmap may effectively signal to the wireless device 14 the number of TTI(s) in which the DCI message 20 schedules transmission(s), e.g., on a certain serving cell. The wireless device 14 in these embodiments may therefore derive the number of allocated TTIs for each serving cell from the time domain resource allocation(s) (e.g., time allocation bitmap(s)) included in the DCI message 20.

In these and other embodiments, the DCI message 20 is flexibly configurable to schedule any number of transmissions in any number of TTIs, on any number of serving cells. The DCI message 20 may thereby enable fast multi-TTI scheduling or allocation so as to adapt to fluctuating traffic demands. This may prove particularly advantageous, for instance, to handle quick spikes in traffic demand attributable to a high-bandwidth application, in order to meet an associated latency bound.

Figure 8:
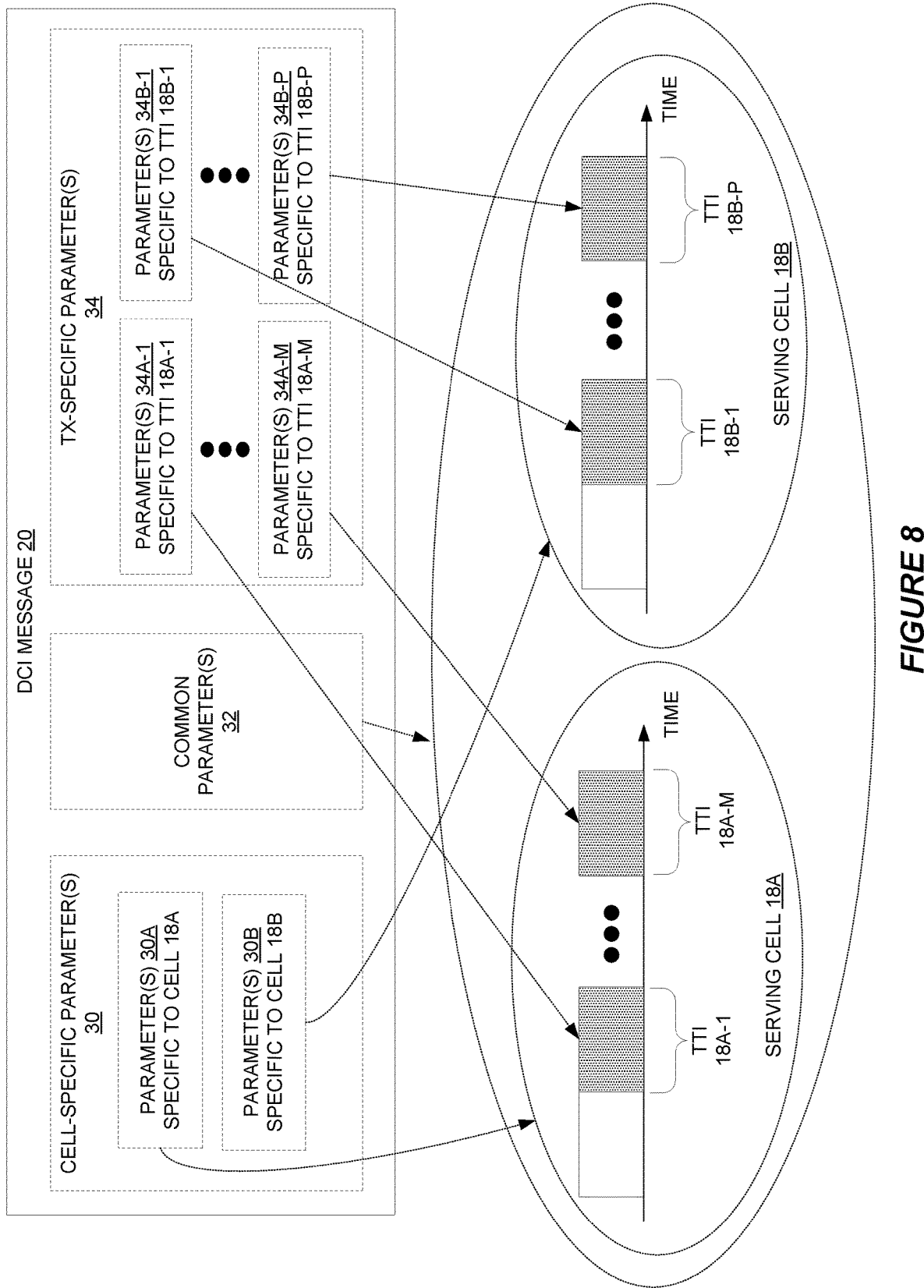
FIG. 8 is a block diagram of a downlink control information message according to yet other embodiments.

Some embodiments are alternatively or additionally able to adapt to varying radio conditions, e.g., which vary among different serving cells and/or vary across TTIs scheduled by the DCI message 20. FIG. 8, for example, shows that in these and other embodiments the DCI message 20 may indicate both cell-specific parameters 30 and common parameters 32. The cell-specific parameters 30 are each specific to a certain serving cell. In this regard, a cell-specific parameter 30 that is specific to a certain serving cell is a parameter that is common to all transmissions scheduled by the DCI message 20 for transmission on that certain serving cell. As shown in FIG. 8, for instance, the DCI message 20 indicates parameter(s) 30A that are specific to serving cell 18A so as to be common to all UL transmissions 22U scheduled by the DCI message 20 for transmission in respective TTIs 18A-1 . . . 18A-M on serving cell 18A. And the DCI message 20 also indicates parameter(s) 30B that are specific to serving cell 18B so as to be common to all UL transmissions 22U scheduled by the DCI message 20 for transmission in respective TTIs 18B-1 . . . 18B-P on serving cell 18B. Generally, then, for a certain cell-specific parameter 30, the DCI message 20 may indicate one such cell-specific parameter 30 for each serving cell on which the DCI message 20 schedules at least one transmission. The cell-specific parameters 30 may thereby advantageously account for potentially different radio conditions on different serving cells. Meanwhile, the common parameter(s) 32 indicated by the DCI message 20 are each common to all transmissions scheduled by the DCI message 20, i.e., across all serving cells and all TTIs. Signaling common parameter(s) 32 in this way may advantageously avoid duplicate signaling for parameters that are configured with common values across serving cells and TTIs, so as to reduce signaling overhead.

In some embodiments, the DCI message 20 further indicates one or more transmission-specific parameters 34 as shown. Each transmission-specific parameter 34 is specific to a certain transmission scheduled by the DCI message 20. In the example of FIG. 8, for instance, the DCI message 20 indicates parameter(s) 34A-1 specific to the transmission scheduled in TTI 18A-1 on serving cell 18A, parameter(s) 34A-M specific to the transmission scheduled in TTI 18A-M on serving cell 18A, parameter(s) 34B-1 specific to the transmission scheduled in TTI 18B-1 on serving cell 18B, and parameter(s) 34B-P specific to the transmission scheduled in TTI 18B-P on serving cell 18B. Generally, then, for a certain transmission-specific parameter 34, the DCI message 20 may indicate one such transmission-specific parameter 34 for each transmission scheduled by the DCI message 20. The transmission-specific parameters 34 may thereby advantageously account for potentially different radio conditions in different TTIs on the same serving cell and/or across different serving cells. Generally, then, some embodiments advantageously allow flexible transmission-specific and/or cell-specific configuration from a single DCI message 20 intended for multiple TTIs and/or multiple serving cells, e.g., in order to quickly adapt to radio conditions that fluctuate across transmissions and/or cells.

Consider some examples illustrating realization of the parameters that may be indicated by the DCI message 20. For scheduling DL transmissions (e.g., PDSCH transmissions) on one or more serving cells, the common parameter(s) 32 may include an identifier for DCI format(s), a downlink assignment index, a transmit power control (TPC) command for a scheduled physical uplink control channel (PUCCH), a PUCCH resource indicator, and/or a PDSCH-to-HARQ feedback timing indicator. Alternatively or additionally, the cell-specific parameter(s) 30 may include a carrier indicator, a bandwidth part (BWP) indicator, a frequency domain resource assignment, a virtual resource block (VRB) to physical resource block (PRB) mapping, a PRB bundling size indicator, a rate matching indicator, a zero-power (ZP) Channel State Information Reference Signal (CSI-RS) trigger, antenna port(s) indicator, a transmission configuration indication, a sounding reference signal (SRS) request, and/or a Demodulation Reference Signal (DMRS) sequence initialization parameter. Alternatively or additionally, the transmission-specific parameter(s) 34 may include a time domain resource assignment, a Modulation and coding scheme (MCS) indicator, a new data indicator, a redundancy version indicator, a HARQ process number, code block group (CBG) transmission information (CBGTI), and/or CBG flushing out information (CBGFI).

As other examples, for scheduling UL transmissions (e.g., PUSCH transmissions) on one or more serving cells, the common parameter(s) 32 may include an identifier for DCI format(s), a downlink assignment index, and/or a beta offset indicator. Alternatively or additionally, the cell-specific parameter(s) 30 may include a carrier indicator, an uplink/supplementary uplink indicator, a bandwidth part (BWP) indicator, a frequency domain resource assignment, a frequency hopping flag, a transmit power control (TPC) command for a scheduled PUSCH, a sounding reference signal (SRS) resource indicator, precoding information, a number of transmission layers, antenna port(s), an SRS request, a CSI request, a phase tracking reference signal (PTRS)—Demodulation Reference Signal (DMRS) association, a DMRS sequence initialization parameter, and/or an uplink shared channel (UL-SCH) indicator. Alternatively or additionally, the transmission-specific parameter(s) 34 may include a time domain resource assignment, a Modulation and coding scheme (MCS) indicator, a new data indicator, a redundancy version indicator, a HARQ process number, and/or code block group (CBG) transmission information (CBGTI).

Taking MCS as an example realization, transmission-specific values for MCS may allow configuring more conservative (i.e., robust) MCS for transmissions closer to the latency bound. This advantageously increases the likelihood of successfully delivering these transmissions, because, if delivery fails, they may not be able to be retransmitted before the latency bound.

Regardless of the particular nature or type of the parameters, in some embodiments, the DCI message 20 explicitly signals or includes multiple values of a cell-specific parameter, one for each serving cell on which the DCI message 20 schedules a transmission. Alternatively or additionally, the DCI message 20 in some embodiments explicitly signals or includes multiple values of a transmission-specific parameter, one for each transmission scheduled by the DCI message 20.

In other embodiments, by contrast, the DCI message 20 may only implicitly signal a value of a cell-specific parameter for at least one serving cell and/or only implicitly signal a value of a transmission-specific parameter for at least one transmission. In some embodiments, for example, the DCI message 20 explicitly indicates a value of a transmission-specific parameter for a first transmission and implicitly indicates a value of the transmission-specific parameter for a second transmission, e.g., based on or as a function of the explicitly indicated value for the first transmission. The wireless device 14 in this case may thereby derive the value of the transmission-specific parameter for the second transmission from the explicitly indicated value of the transmission-specific parameter for the first transmission. Implicitly signaling parameter values in this way may advantageously reduce the size of the DCI message 20 yet still convey parameter values for multiple transmissions and/or multiple cells.

Figure 9:
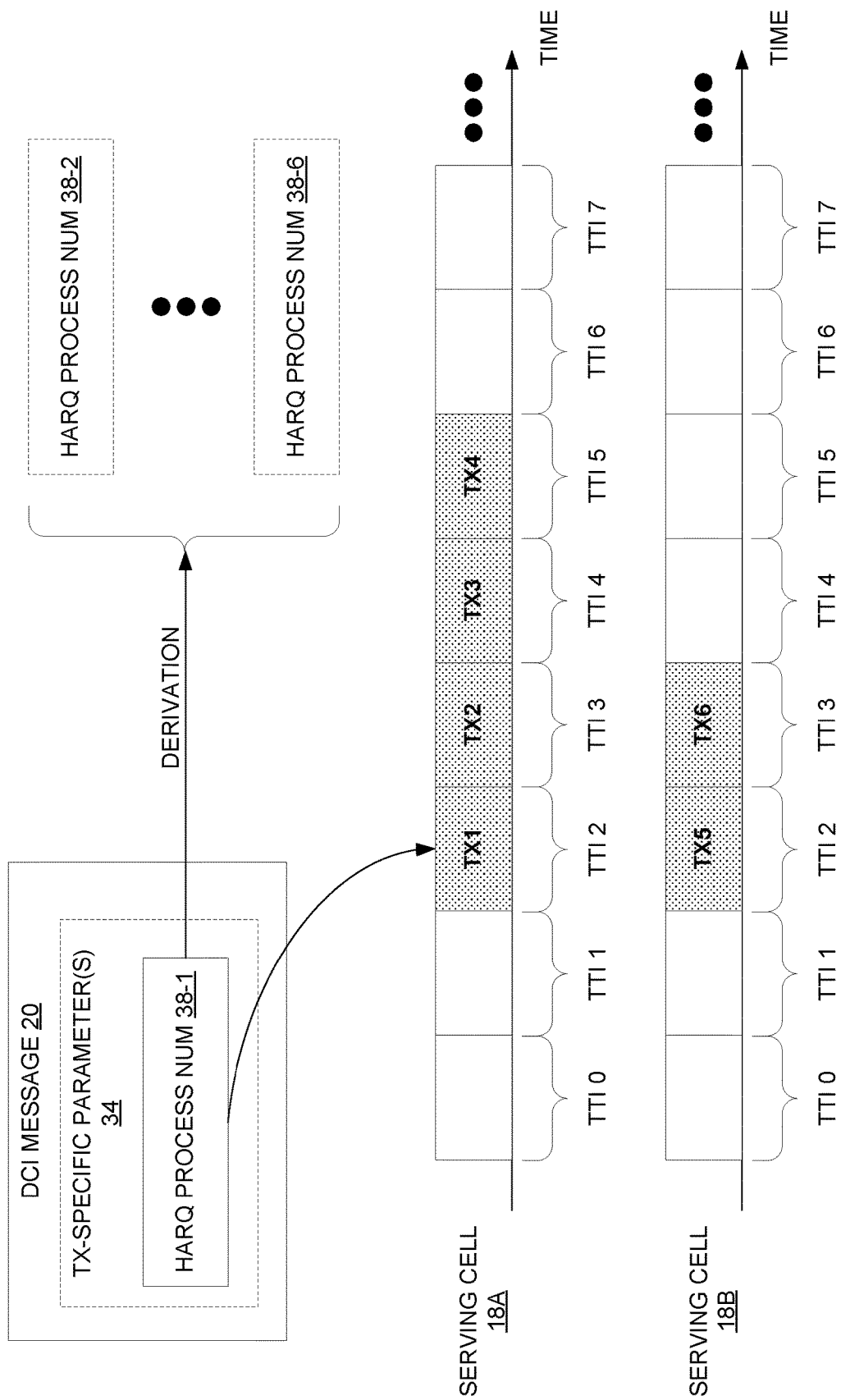
FIG. 9 is a block diagram of a downlink control information message according to further embodiments.

Consider an example shown in FIG. 9 for a HARQ process number parameter. In this example, the DCI message 20 explicitly indicates the value of a HARQ process number parameter for a specific transmission TX1 that is scheduled to occur in TTI 2 on serving cell 18A. The DCI message 20 does not explicitly indicate the value of the HARQ process number parameter for any other transmissions scheduled by the DCI message 20, but instead only implicitly indicates this. Specifically in this regard, the transmissions scheduled by the DCI message 20 are numbered in ascending order of their starting time and then in ascending order of their serving cell index. In this example, then, the transmissions scheduled by the DCI message 20 are numbered TX1 to TX6 as shown, based on the serving cell index of cell 18A being lower than the serving cell index of cell 18B. With this understood ordering, the values of the HARQ process number parameter for other transmissions TX2-TX6 may be derived from the value of the HARQ process number parameter explicitly signaled for transmission TX1. For example, in some embodiments, the DCI message 20 explicitly indicates that the value of the HARQ process number parameter is equal to j for TX1. And the value of the HARQ process number parameter for TX k (fork>1) may be derived as (j+k−1) mod $P_i$, where $P_i$ is the number of HARQ processes configured for serving cell i. So, for example, if the value of the HARQ process number parameter explicitly indicated for TX1 is 1 and if $P_1$=5 and $P_2$=4, the value of the HARQ process number for TX2 may be derived as (1+2−1) mod 5=2, and the value of the HARQ process number for TX5 may be derived as (1+5−1) mod 4=1.

Regardless of the way parameter values are signaled, whether explicitly or implicitly, the DCI message 20 may generally have a certain format that is conducive to scheduling multiple transmissions as described herein. In some embodiments, this means the wireless device 14 may blindly decode received DCI messages according to a number of DCI message formats, including the certain format conducive to multi-transmission scheduling. To reduce the number of blind decoding attempts needed when multi-transmission scheduling is not needed or not used, control plane signaling in some embodiments may configure whether and/or how the wireless device 14 is to attempt to decode received DCI messages according to the certain format. The control plane signaling may for example be Radio Resource Control (RRC) signaling (e.g., in the form of an RRC (re)configuration message), a Medium Access Control (MAC) Control Element (CE) command, or even another DCI message. Regardless, the control plane signaling may activate or deactivate use of the certain format for multi-transmission scheduling. The wireless device 14 in such embodiments attempts or does not attempt to decode received DCI messages according to the certain format, depending respectively on whether use of the certain format is activated or deactivated. By refraining from attempts to decode received DCI messages according to the certain format when use of that format is deactivated, the wireless device 14 may advantageously conserve processing resources, power, and decoding time.

Note that, as used herein, a serving cell of the wireless device 14 is a cell on which the wireless device 14 is camped. A wireless device 14 that camps on a cell monitors one or more downlink channels of the cell, e.g., from a state in which the wireless device 14 has acquired system information and knows how to send a random access preamble on the random access channel to access the cell. In some embodiments, when the wireless device 14 is camped on a cell, the wireless device 14 has completed the cell (re) selection process, has chosen a cell, monitors system information, and (in most cases) monitors paging information. Camping therefore enables the wireless device 14 to receive system information, initially access the network on the control channel of the cell on which it is camped, and receive a paging message and respond.

Note, then, that a wireless device 14 herein may have multiple serving cells, e.g., in the sense that the wireless device 14 is camped on multiple cells at the same time. Such may be the case, for instance, in carrier aggregation and/or multi-connectivity operation.

As applied to carrier aggregation, multiple serving cells of the wireless device 14 may refer or correspond to multiple component carriers, e.g., provided by the same radio network node such as the same eNB or gNB. In this sense, then, the wireless device 14 may simultaneously transmit and/or receive on multiple component cells/carriers from a single radio network node.

Multi-connectivity by contrast refers to the simultaneous connection of the wireless device 14 (e.g., at a radio resource control, RRC, layer) to multiple different radio network nodes, or to multiple different cells served by different radio network nodes. For example, in multi-connectivity, a wireless device with multiple receivers (Rx) and/or transmitters (Tx) may utilize radio resources amongst one or more radio access technologies (e.g., New Radio, NR, and/or E-UTRA) provided by multiple distinct schedulers connected via a non-ideal backhaul. Multi-radio dual connectivity (MR-DC) in this regard is a generalization of Intra-E-UTRA DC, where a multiple Rx/Tx wireless device may be configured to utilize resources provided by two different nodes connected via a non-ideal backhaul, one providing NR access and the other one providing either E-UTRA or NR access. One node acts as the master node (MN) and the other as the SN. E-UTRAN for instance supports MR-DC via E-UTRA-NR dual connectivity (EN-DC), in which a wireless device is connected to one eNB that acts as a MN and one en-gNB that acts as a secondary node (SN). Either way, in MR-DC, the wireless device may have a single Radio Resource Control (RRC) state, based on the MN RRC and a single control plane connection towards the core network.

Note also that a transmission is described herein as being on a serving cell. A serving cell in this sense may refer or otherwise correspond to a serving carrier. In another sense, though, a transmission may equally be described as being over a serving cell or in a serving cell.

Figure 10:
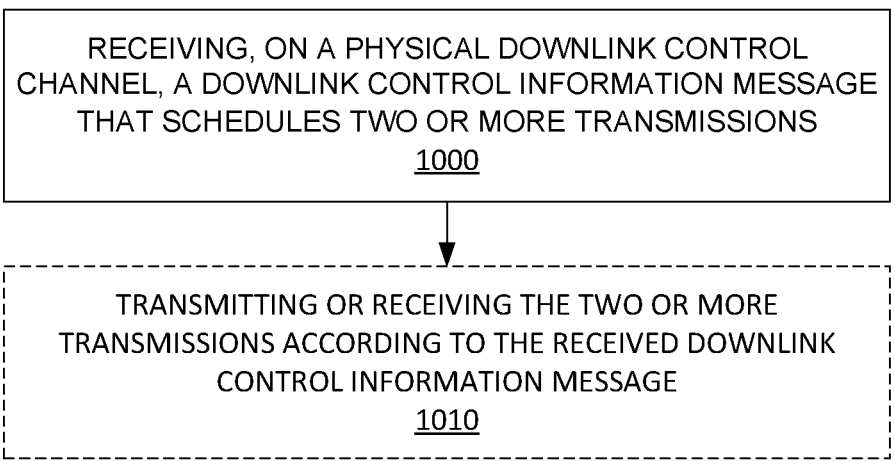
FIG. 10 is a logic flow diagram of a method performed by a wireless device according to some embodiments.

In view of the modifications and variations herein, FIG. 10 depicts a method performed by a wireless device 14 in accordance with some embodiments herein. The method includes receiving, on a physical downlink control channel (e.g., a PDCCH), a downlink control information message 20 that schedules two or more transmissions (Block 1000). In some embodiments, for example, the downlink control information message 20 schedules two or more (e.g., non-redundant) downlink transmissions 22D to be transmitted to the wireless device 14 in respective transmission time intervals, TTIs, 16A-1 . . . 16A-N on a first downlink serving cell 16A of the wireless device 14. In other embodiments, as another example, the downlink control information message 20 schedules one or more (e.g., non-redundant) uplink transmissions 22U to be transmitted from the wireless device 14 in one or more respective TTIs 18A-1 . . . 18A-M on a first uplink serving cell 18A of the wireless device 14 and one or more (e.g., non-redundant) uplink transmissions 22U to be transmitted from the wireless device 14 in one or more respective TTIs 18B-1 . . . 18B-P on a second uplink serving cell 18B of the wireless device 14.

In some embodiments, the method also comprises transmitting or receiving the two or more transmissions according to the received downlink control information message (Block 1010). In some embodiments, for example, this involves receiving the two or more (e.g., non-redundant) downlink transmissions 22D. In other embodiments, this involves transmitting the one or more (e.g., non-redundant) uplink transmissions 22U on the first uplink serving cell 18A and the one or more (e.g., non-redundant) uplink transmissions 22U on the second uplink serving cell 18B.

FIG. 11 depicts a method performed by a radio network node 12 in accordance with other embodiments herein. The method includes transmitting, on a physical downlink control channel (e.g., a PDCCH), a downlink control information message 20 that schedules two or more transmissions (Block 1100). In some embodiments, for example, the downlink control information message 20 schedules two or more (e.g., non-redundant) downlink transmissions 22D to be transmitted to the wireless device 14 in respective transmission time intervals, TTIs, 16A-1 . . . 16A-N on a first downlink serving cell 16A of the wireless device 14. In other embodiments, as another example, the downlink control information message 20 schedules one or more (e.g., non-redundant) uplink transmissions 22U to be transmitted from the wireless device 14 in one or more respective TTIs 18A-1 . . . 18A-M on a first uplink serving cell 18A of the wireless device 14 and one or more (e.g., non-redundant) uplink transmissions 22U to be transmitted from the wireless device 14 in one or more respective TTIs 18B-1 . . . 18B-P on a second uplink serving cell 18B of the wireless device 14.

In some embodiments, the method also comprises transmitting or receiving the two or more transmissions according to the received downlink control information message (Block 1110). In some embodiments, for example, this involves transmitting the two or more (e.g., non-redundant) downlink transmissions 22D. In other embodiments, this involves receiving the one or more (e.g., non-redundant) uplink transmissions 22U on the first uplink serving cell 18A and/or the one or more (e.g., non-redundant) uplink transmissions 22U on the second uplink serving cell 18B.

Embodiments herein also include corresponding apparatuses. Embodiments herein for instance include a wireless device 14 configured to perform any of the steps of any of the embodiments described above for the wireless device 14.

Embodiments also include a wireless device 14 comprising processing circuitry and power supply circuitry. The processing circuitry is configured to perform any of the steps of any of the embodiments described above for the wireless device 14. The power supply circuitry is configured to supply power to the wireless device 14.

Embodiments further include a wireless device 14 comprising processing circuitry. The processing circuitry is configured to perform any of the steps of any of the embodiments described above for the wireless device 14. In some embodiments, the wireless device 14 further comprises communication circuitry.

Embodiments further include a wireless device 14 comprising processing circuitry and memory. The memory contains instructions executable by the processing circuitry whereby the wireless device 14 is configured to perform any of the steps of any of the embodiments described above for the wireless device 14.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 14. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 12 configured to perform any of the steps of any of the embodiments described above for the radio network node 12.

Embodiments also include a radio network node 12 comprising processing circuitry and power supply circuitry. The processing circuitry is configured to perform any of the steps of any of the embodiments described above for the radio network node 12. The power supply circuitry is configured to supply power to the radio network node 12.

Embodiments further include a radio network node 12 comprising processing circuitry. The processing circuitry is configured to perform any of the steps of any of the embodiments described above for the radio network node 12. In some embodiments, the radio network node 12 further comprises communication circuitry.

Embodiments further include a radio network node 12 comprising processing circuitry and memory. The memory contains instructions executable by the processing circuitry whereby the radio network node 12 is configured to perform any of the steps of any of the embodiments described above for the radio network node 12.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
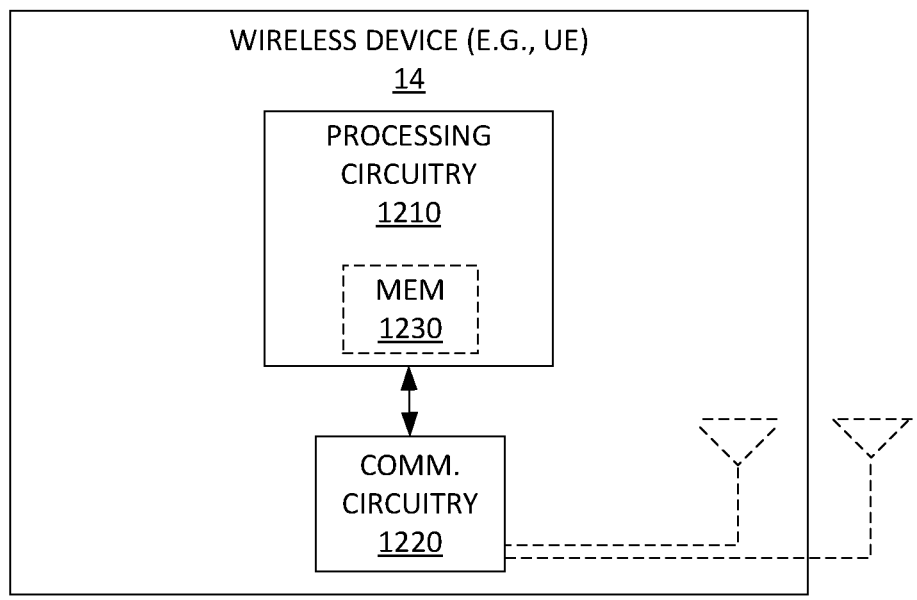
FIG. 12 is a block diagram of a wireless device according to some embodiments.

FIG. 12 for example illustrates a wireless device 14 as implemented in accordance with one or more embodiments. As shown, the wireless device 14 includes processing circuitry 1210 and communication circuitry 1220. The communication circuitry 1220 (e.g., radio circuitry) is configured to transmit and/or receive information to and/or from one or more other nodes, e.g., via any communication technology. Such communication may occur via one or more antennas that are either internal or external to the wireless device 1200. The processing circuitry 1210 is configured to perform processing described above, e.g., in FIG. 10, such as by executing instructions stored in memory 1230. The processing circuitry 1210 in this regard may implement certain functional means, units, or modules.

Figure 13:
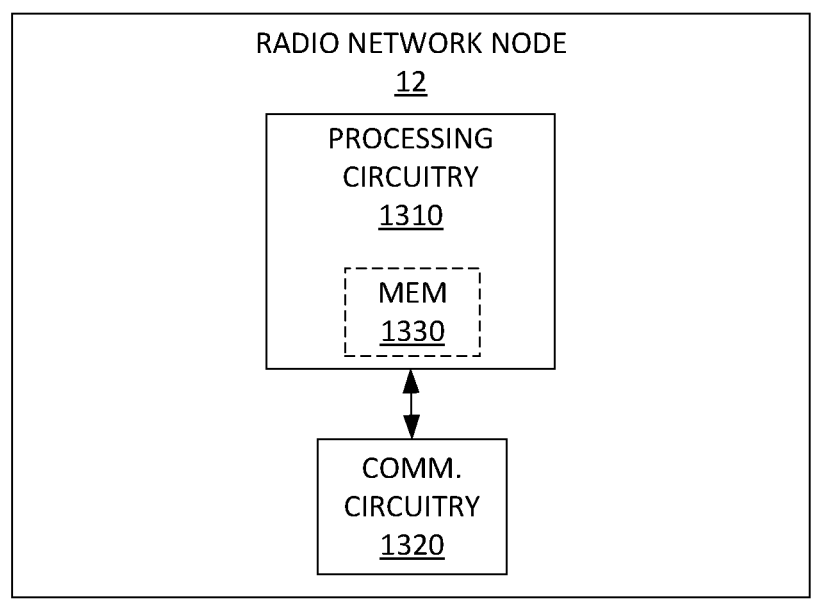
FIG. 13 is a block diagram of a radio network node according to some embodiments.

FIG. 13 illustrates a radio network node 12 as implemented in accordance with one or more embodiments. As shown, the radio network node 12 includes processing circuitry 1310 and communication circuitry 1320. The communication circuitry 1320 is configured to transmit and/or receive information to and/or from one or more other nodes, e.g., via any communication technology. The processing circuitry 1310 is configured to perform processing described above, e.g., in FIG. 11, such as by executing instructions stored in memory 1330. The processing circuitry 1310 in this regard may implement certain functional means, units, or modules.

Those skilled in the art will also appreciate that embodiments herein further include corresponding computer programs.

A computer program comprises instructions which, when executed on at least one processor of wireless device 14, cause the wireless device 14 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of the wireless device 14, cause the wireless device 14 to perform as described above.

Embodiments further include a computer program product comprising program code portions for performing the steps of any of the embodiments herein when the computer program product is executed by a wireless device 14. This computer program product may be stored on a computer readable recording medium.

Also included herein is a computer program comprises instructions which, when executed on at least one processor of radio network node 12, cause the radio network node 12 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of the radio network node 12, cause the radio network node 12 to perform as described above.

Embodiments further include a computer program product comprising program code portions for performing the steps of any of the embodiments herein when the computer program product is executed by a radio network node 12. This computer program product may be stored on a computer readable recording medium.

Figure 14:
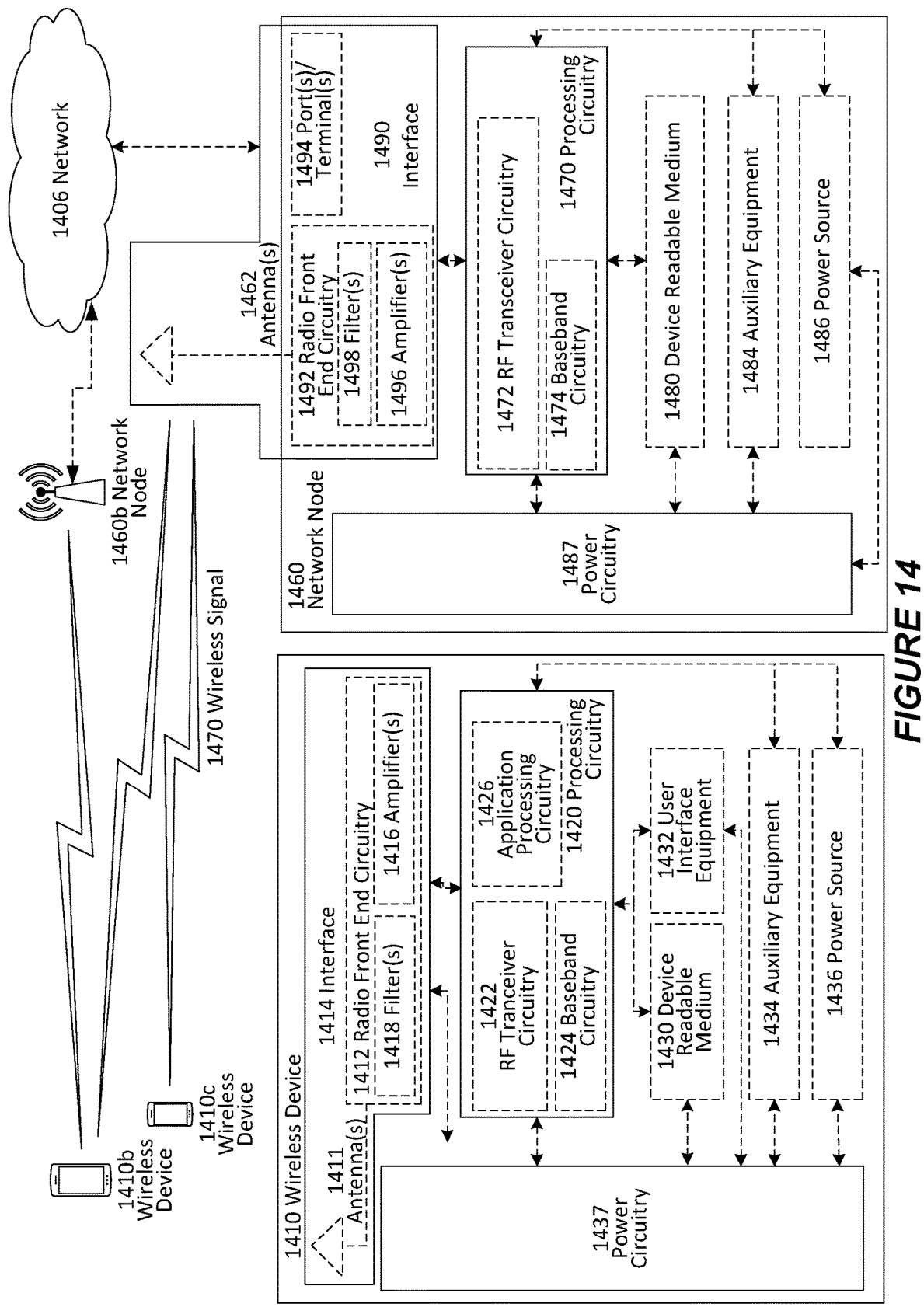
FIG. 14 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and WDs 1410, 1410b, and 1410c. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496.

Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD)

or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
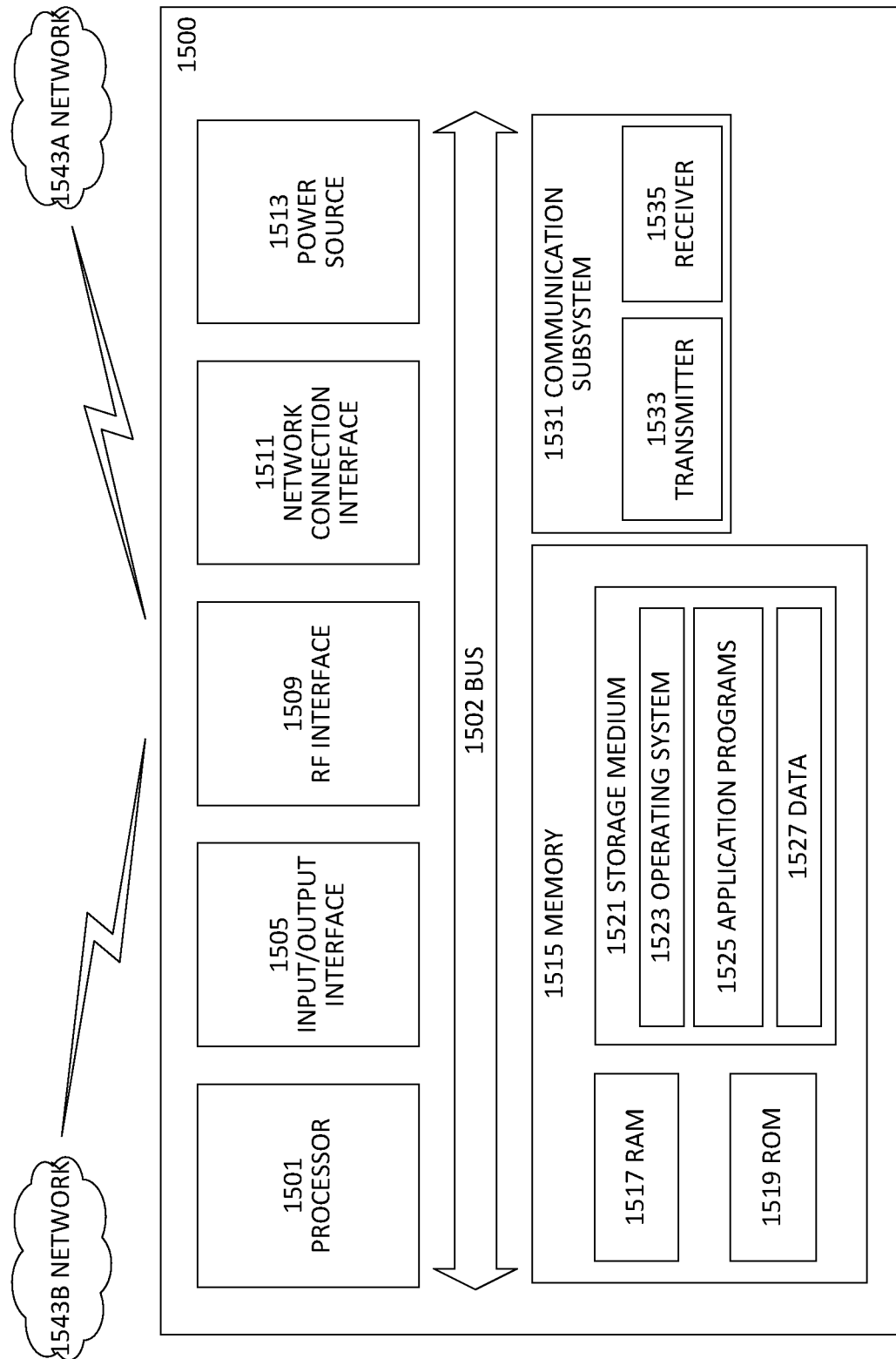
FIG. 15 is a block diagram of a user equipment according to some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network 1543a. Network 1543a may encompass wired and/or wireless networks such as a local-area network (LAN), a wide-area network (WAN), a computer network, a wireless network, a telecommunications network, another like network or any combination thereof. For example, network 1543a may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 15, processing circuitry 1501 may be configured to communicate with network 1543b using communication subsystem 1531. Network 1543a and network 1543b may be the same network or networks or different network or networks. Communication subsystem 1531 may be configured to include one or more transceivers used to communicate with network 1543b. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543b may encompass wired and/or wireless networks such as a local-area network (LAN), a wide-area network (WAN), a computer network, a wireless network, a telecommunications network, another like network or any combination thereof. For example, network 1543b may be a cellular network, a Wi-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
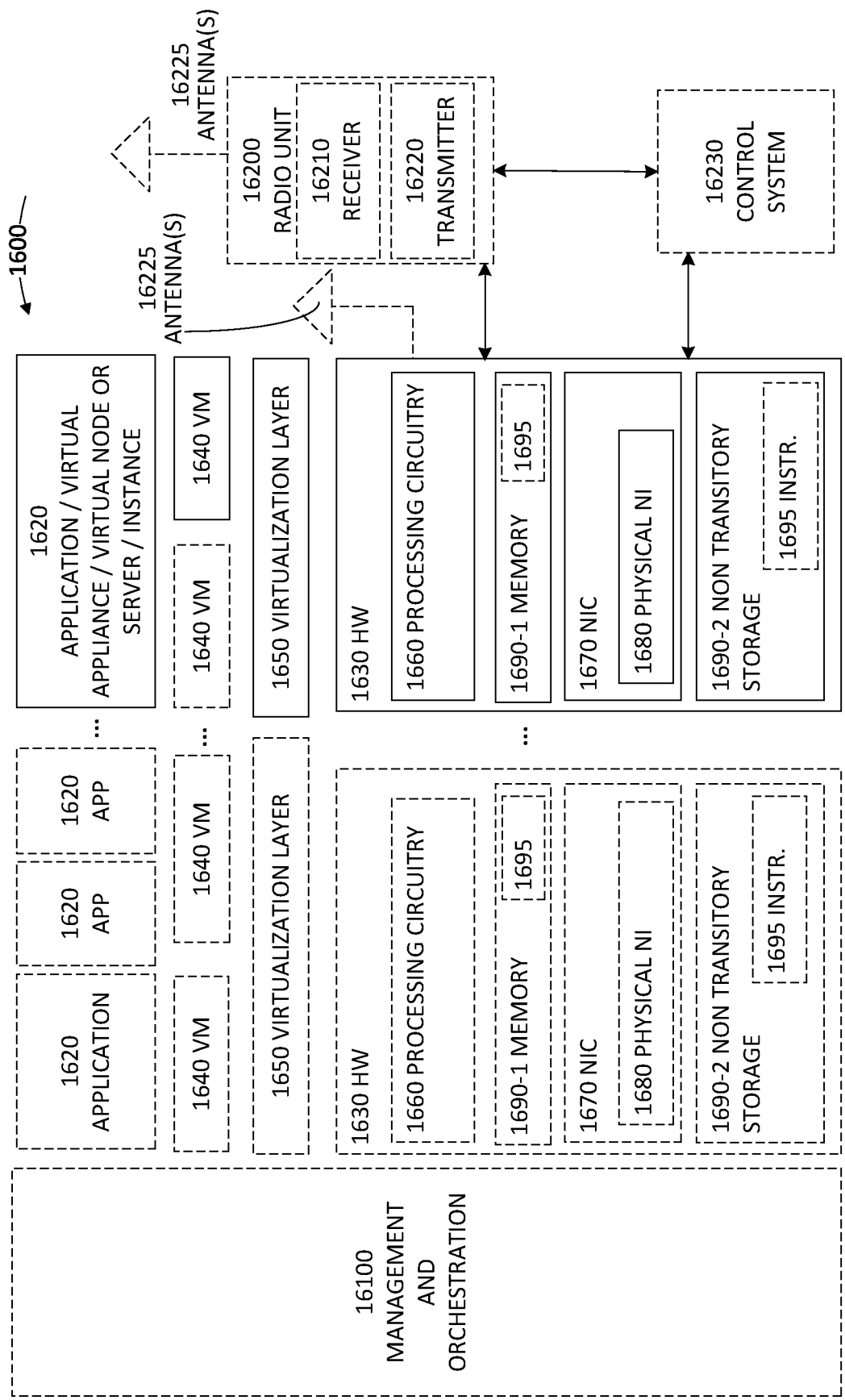
FIG. 16 is a block diagram of a virtualization environment according to some embodiments.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 17:
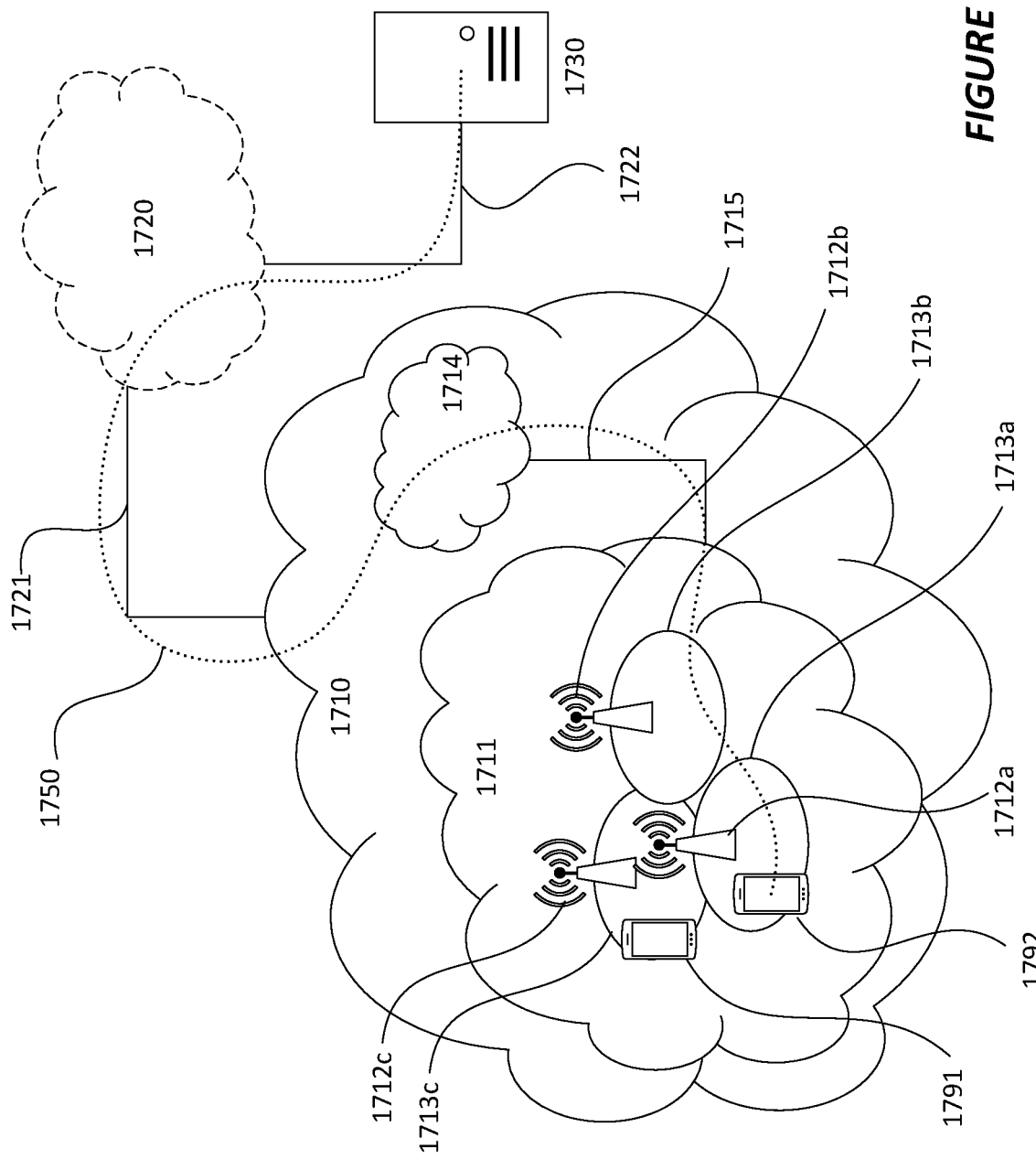
FIG. 17 is a block diagram of a communication network with a host computer according to some embodiments.

FIG. 17 illustrates a telecommunication network connected via an intermediate network to a host computer in accordance with some embodiments. In particular, with reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Figure 18:
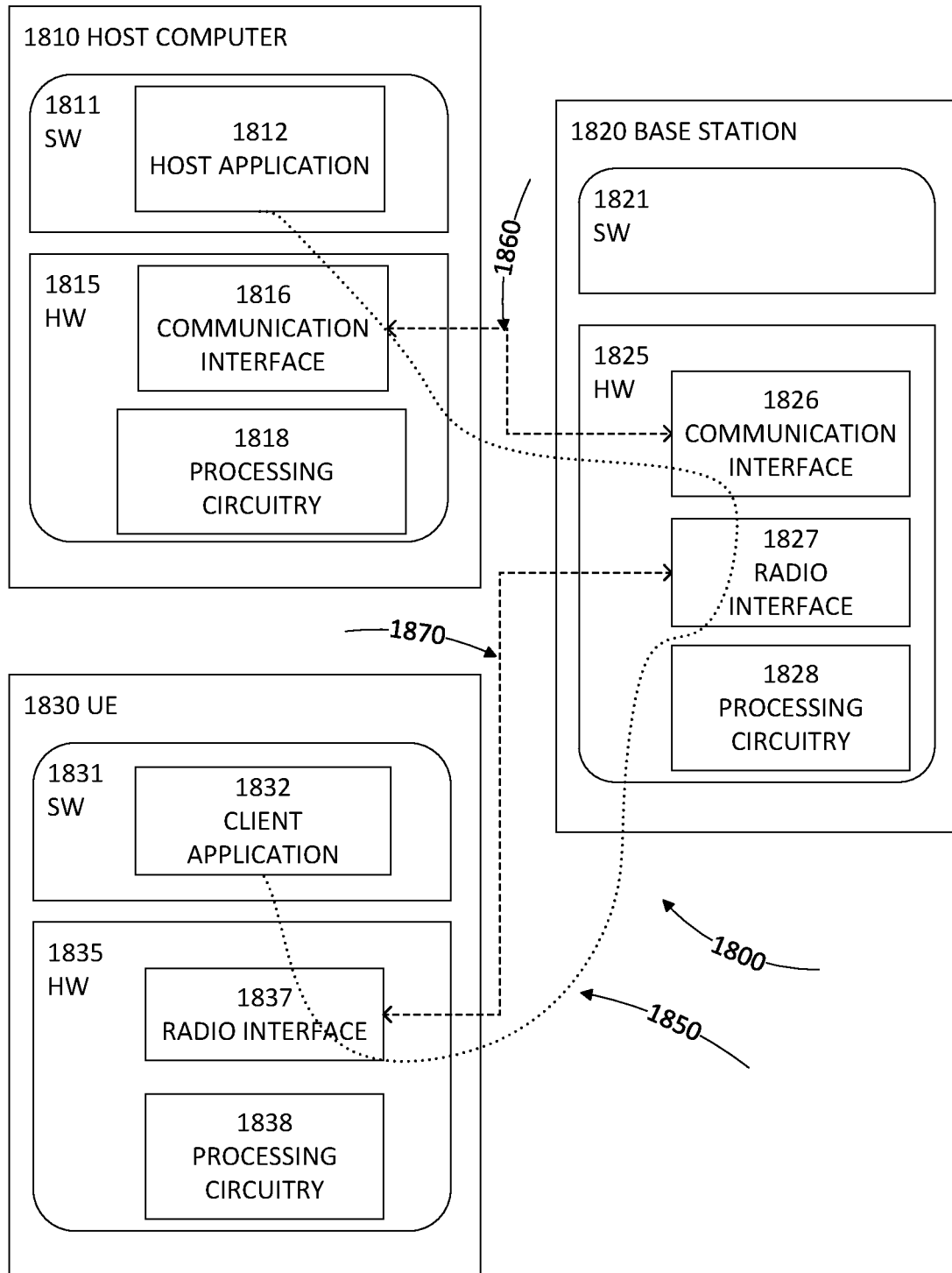
FIG. 18 is a block diagram of a host computer according to some embodiments.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 18 may be similar or identical to host computer 1730, one of base stations 1712a, 1712b, 1712c and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
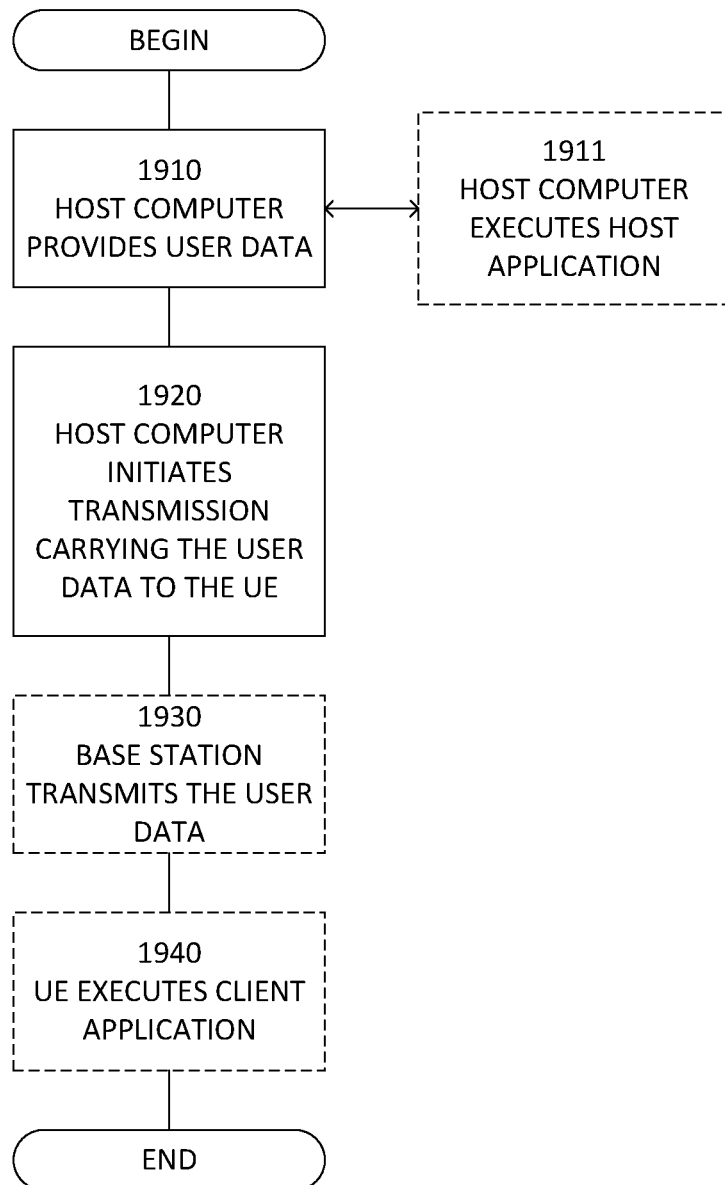
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
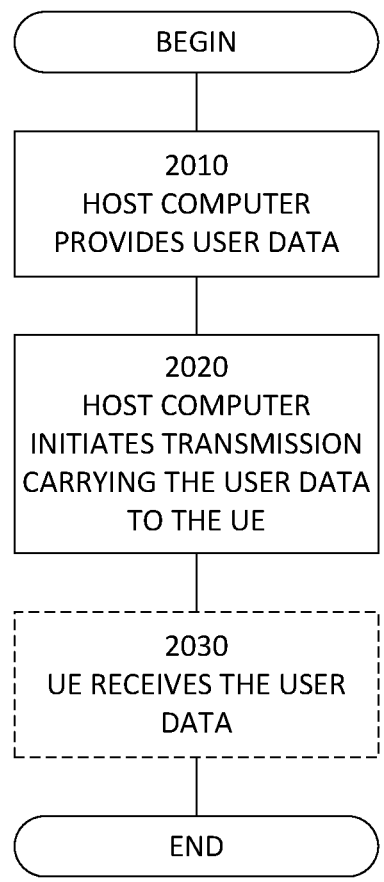
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
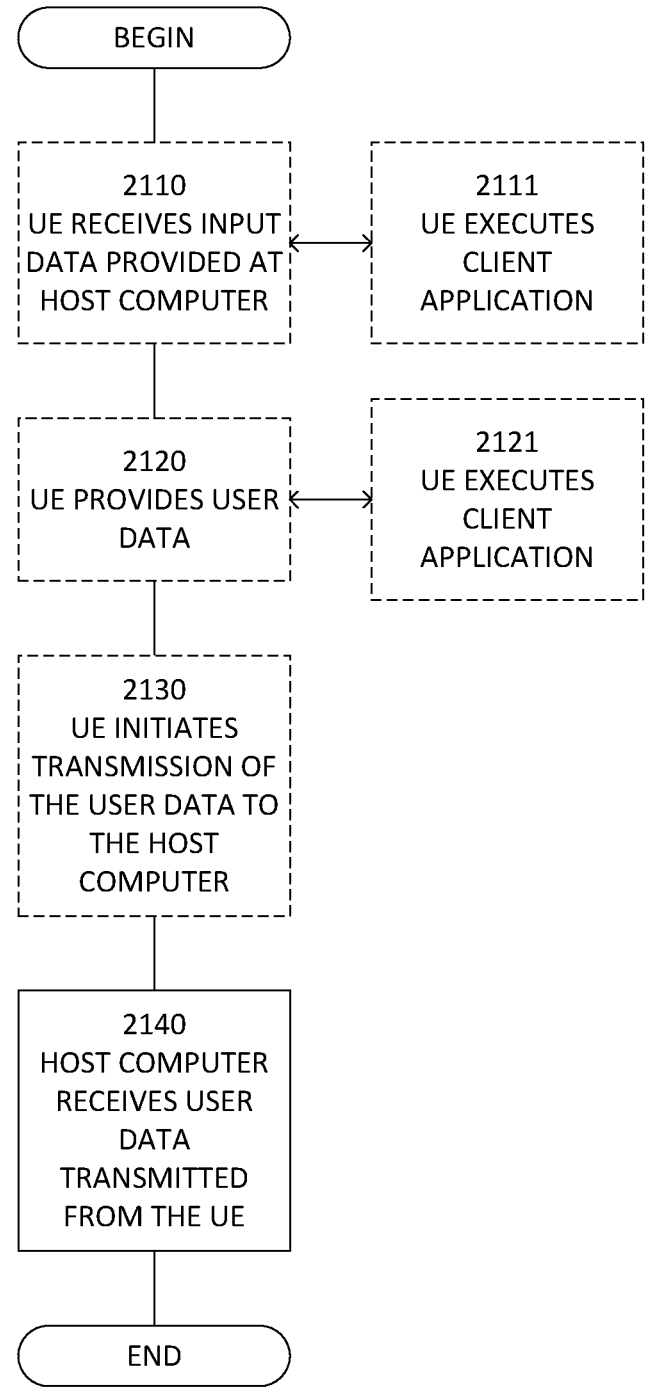
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
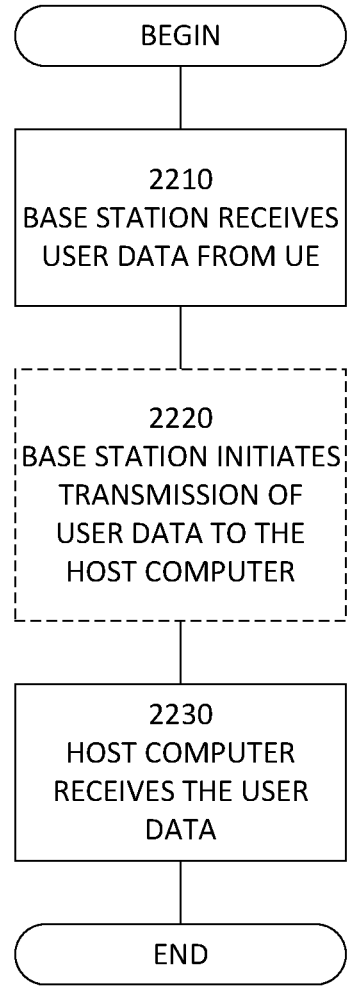
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer.

The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

1. A method performed by a wireless device (14), the method comprising:
    receiving (1000), on a physical downlink control channel, a downlink control information message (20) that schedules:
        two or more non-redundant downlink transmissions to be transmitted to the wireless device (14) in respective transmission time intervals, TTIs, on a first downlink serving cell (16A) of the wireless device (14); or
        one or more non-redundant uplink transmissions to be transmitted from the wireless device (14) in one or more respective TTIs on a first uplink serving cell (18A) of the wireless device (14) and one or more non-redundant uplink transmissions to be transmitted from the wireless device (14) in one or more respective TTIs on a second uplink serving cell (18B) of the wireless device (14).

2. The method of embodiment 1, further comprising receiving (1010) the two or more non-redundant downlink transmissions, or transmitting (1010) the one or more non-redundant uplink transmissions on the first uplink serving cell (18A) and the one or more non-redundant uplink transmissions on the second uplink serving cell (18B), according to the received downlink control information message (20).

3. The method of any of embodiments 1-2, wherein the downlink control information message (20):
    indicates in how many TTIs the two or more non-redundant downlink transmissions are to be transmitted on the downlink serving cell; or
    indicates in how many TTIs the one or more non-redundant uplink transmissions are to be transmitted on the first uplink serving cell (18A), and/or in how many TTIs the one or more non-redundant uplink transmissions are to be transmitted on the second uplink serving cell (18B).

4. The method of any of embodiments 1-3, wherein the downlink control information message (20) includes:
    one or more cell-specific parameters that are each specific to a serving cell and common to all non-redundant downlink transmissions or all non-redundant uplink transmissions scheduled by the downlink control information message (20) for transmission on that serving cell; and
    one or more common parameters that are each common to all non-redundant downlink transmissions or all non-redundant uplink transmissions scheduled by the downlink control information message (20).

5. The method of embodiment 4, wherein the downlink control information message (20) further includes one or more transmission-specific parameters that are each specific to a certain non-redundant downlink transmission or non-redundant uplink transmission scheduled by the downlink control information message (20).

6. The method of embodiment 5, wherein at least one of the one or more transmission-specific parameters explicitly indicates a value for a certain non-redundant downlink transmission or non-redundant uplink transmission scheduled by the downlink control information message (20), and wherein the method further comprises deriving, from the indicated value, a value for another non-redundant downlink transmission or non-redundant uplink transmission scheduled by the downlink control information message (20).

7. The method of any of embodiments 5-6, wherein at least one of the one or more transmission-specific parameters is a modulation and coding scheme parameter.

8. The method of any of embodiments 1-7, wherein:
    at least some of the TTIs in which the two or more non-redundant downlink transmissions are to be transmitted are non-consecutive TTIs; or at least some of the one or more TTIs in which the one or more non-redundant uplink transmissions are to be transmitted on the first uplink serving cell (18A) are non-consecutive TTIs, and/or at least some of the one or more TTIs in which the one or more non-redundant uplink transmissions are to be transmitted on the second uplink serving cell (18B) are non-consecutive TTIs.

9. The method of any of embodiments 1-8, wherein the downlink control information message (20) indicates a TTI offset separately for each of the two or more non-redundant downlink transmissions, for each of the one or more non-redundant uplink transmissions on the first uplink serving cell (18A), or for each of the one or more non-redundant uplink transmissions on the second uplink serving cell (18B), wherein the TTI offset is an offset between a TTI in which the downlink control information message (20) is received and a TTI in which a transmission is to be transmitted.

10. The method of any of embodiments 1-8, wherein the downlink control information message (20) includes a time allocation bitmap that indicates in which TTIs the two or more non-redundant downlink transmissions are to be transmitted on the first downlink serving cell (16A), the one or more non-redundant uplink transmissions are to be transmitted on the first uplink serving cell (18A), or the one or more non-redundant uplink transmissions are to be transmitted on the second uplink serving cell (18B), wherein different bits in the time allocation bitmap indicate whether or not a non-redundant downlink transmission or a non-redundant uplink transmission is to be transmitted in different respective TTIs included in a set of TTIs.

11. The method of any of embodiments 1-10, wherein the downlink control information message (20) has a certain message format, and wherein the method further comprises receiving control plane signaling that configures whether and/or how the wireless device (14) is to attempt to decode received downlink control information messages according to the certain message format.

12. The method of any of embodiments 1-11, wherein the downlink control information message (20) schedules the two or more non-redundant downlink transmissions to be transmitted to the wireless device (14) in the two or more respective TTIs on the first downlink serving cell (16A) of the wireless device (14).

13. The method of embodiment 12, wherein the downlink control information message (20) also schedules one or more non-redundant downlink transmissions to be transmitted to the wireless device (14) in one or more respective TTIs on a second downlink serving cell of the wireless device (14).

14. The method of any of embodiments 1-11, wherein the downlink control information message (20) schedules the one or more non-redundant uplink transmissions to be transmitted from the wireless device (14) in one or more respective TTIs on the first uplink serving cell (18A) of the wireless device (14) and the one or more non-redundant uplink transmissions to be transmitted from the wireless device (14) in the one or more respective TTIs on the second uplink serving cell (18B) of the wireless device (14).

15. The method of embodiment 14, wherein the one or more non-redundant uplink transmissions scheduled by the downlink control information to be transmitted from the wireless device (14) in one or more respective TTIs on the first uplink serving cell (18A) of the wireless device (14) comprise two or more non-redundant uplink transmissions, and/or wherein the one or more non-redundant uplink transmissions scheduled by the downlink control information to be transmitted from the wireless device (14) in one or more respective TTIs on the second uplink serving cell (18B) of the wireless device (14) comprise two or more non-redundant uplink transmissions.

16. The method of any of embodiments 1-15, wherein a TTI is a number of Orthogonal Frequency Division Multiplexing, OFDM, symbols over which a non-redundant downlink transmission or a non-redundant uplink transmission spans.

17. The method of any of embodiments 1-16:
   wherein each of the two or more non-redundant downlink transmissions carries data from the same application layer file; or
   wherein each of the one or more non-redundant uplink transmissions on the first uplink serving cell (18A), and each of the one or more non-redundant uplink transmissions on the second uplink serving cell (18B), carries data from the same application layer file.

18. A method performed by a radio network node (12), the method comprising:
   transmitting (1100), on a physical downlink control channel to a wireless device (14), a downlink control information message (20) that schedules:
      two or more non-redundant downlink transmissions to be transmitted to the wireless device (14) in respective transmission time intervals, TTIs, on a first downlink serving cell (16A) of the wireless device (14); or
      one or more non-redundant uplink transmissions to be transmitted from the wireless device (14) in one or more respective TTIs on a first uplink serving cell (18A) of the wireless device (14) and one or more non-redundant uplink transmissions to be transmitted from the wireless device (14) in one or more respective TTIs on a second uplink serving cell (18B) of the wireless device (14).

19. The method of embodiment 18, further comprising transmitting (1110) the two or more non-redundant downlink transmissions, or receiving (1110) the one or more non-redundant uplink transmissions on the first uplink serving cell (18A) and/or the one or more non-redundant uplink transmissions on the second uplink serving cell (18B), according to the transmitted downlink control information message (20).

20. The method of any of embodiments 18-19, wherein the downlink control information message (20):
   indicates in how many TTIs the two or more non-redundant downlink transmissions are to be transmitted on the downlink serving cell; or
   indicates in how many TTIs the one or more non-redundant uplink transmissions are to be transmitted on the first uplink serving cell (18A), and/or in how many TTIs the one or more non-redundant uplink transmissions are to be transmitted on the second uplink serving cell (18B).

21. The method of any of embodiments 18-20, wherein the downlink control information message (20) includes:
   one or more cell-specific parameters that are each specific to a serving cell and common to all non-redundant downlink transmissions or all non-redundant uplink transmissions scheduled by the downlink control information message (20) for transmission on that serving cell; and one or more common parameters that are each common to all non-redundant downlink transmissions or all non-redundant uplink transmissions scheduled by the downlink control information message (20).
22. The method of embodiment 21, wherein the downlink control information message (20) further includes one or more transmission-specific parameters that are each specific to a certain non-redundant downlink transmission or non-redundant uplink transmission scheduled by the downlink control information message (20).
23. The method of embodiment 22, wherein at least one of the one or more transmission-specific parameters explicitly indicates a value for a certain non-redundant downlink transmission or non-redundant uplink transmission scheduled by the downlink control information message (20) and implicitly indicates a value for another non-redundant downlink transmission or non-redundant uplink transmission scheduled by the downlink control information message (20).
24. The method of any of embodiments 22-23, wherein at least one of the one or more transmission-specific parameters is a modulation and coding scheme parameter.
25. The method of any of embodiments 18-24, wherein:
at least some of the TTIs in which the two or more non-redundant downlink transmissions are to be transmitted are non-consecutive TTIs; or
at least some of the one or more TTIs in which the one or more non-redundant uplink transmissions are to be transmitted on the first uplink serving cell (18A) are non-consecutive TTIs, and/or at least some of the one or more TTIs in which the one or more non-redundant uplink transmissions are to be transmitted on the second uplink serving cell (18B) are non-consecutive TTIs.
26. The method of any of embodiments 18-25, wherein the downlink control information message (20) indicates a TTI offset separately for each of the two or more non-redundant downlink transmissions, for each of the one or more non-redundant uplink transmissions on the first uplink serving cell (18A), or for each of the one or more non-redundant uplink transmissions on the second uplink serving cell (18B), wherein the TTI offset is an offset between a TTI in which the downlink control information message (20) is transmitted and a TTI in which a transmission is to be transmitted.
27. The method of any of embodiments 18-25, wherein the downlink control information message (20) includes a time allocation bitmap that indicates in which TTIs the two or more non-redundant downlink transmissions are to be transmitted on the first downlink serving cell (16A), the one or more non-redundant uplink transmissions are to be transmitted on the first uplink serving cell (18A), or the one or more non-redundant uplink transmissions are to be transmitted on the second uplink serving cell (18B), wherein different bits in the time allocation bitmap indicate whether or not a non-redundant downlink transmission or a non-redundant uplink transmission is to be transmitted in different respective TTIs included in a set of TTIs.
28. The method of any of embodiments 18-27, wherein the downlink control information message (20) has a certain message format, and wherein the method further comprises transmitting control plane signaling that configures whether and/or how the wireless device (14) is to attempt to decode received downlink control information messages according to the certain message format.
29. The method of any of embodiments 18-28, wherein the downlink control information message (20) schedules the two or more non-redundant downlink transmissions to be transmitted to the wireless device (14) in the two or more respective TTIs on the first downlink serving cell (16A) of the wireless device (14).
30. The method of embodiment 29, wherein the downlink control information message (20) also schedules one or more non-redundant downlink transmissions to be transmitted to the wireless device (14) in one or more respective TTIs on a second downlink serving cell of the wireless device (14).
31. The method of any of embodiments 18-28, wherein the downlink control information message (20) schedules the one or more non-redundant uplink transmissions to be transmitted from the wireless device (14) in one or more respective TTIs on the first uplink serving cell (18A) of the wireless device (14) and the one or more non-redundant uplink transmissions to be transmitted from the wireless device (14) in the one or more respective TTIs on the second uplink serving cell (18B) of the wireless device (14).
32. The method of embodiment 31, wherein the one or more non-redundant uplink transmissions scheduled by the downlink control information to be transmitted from the wireless device (14) in one or more respective TTIs on the first uplink serving cell (18A) of the wireless device (14) comprise two or more non-redundant uplink transmissions, and/or wherein the one or more non-redundant uplink transmissions scheduled by the downlink control information to be transmitted from the wireless device (14) in one or more respective TTIs on the second uplink serving cell (18B) of the wireless device (14) comprise two or more non-redundant uplink transmissions.
33. The method of any of embodiments 18-32, wherein a TTI is a number of Orthogonal Frequency Division Multiplexing, OFDM, symbols over which a non-redundant downlink transmission or a non-redundant uplink transmission spans.
34. The method of any of embodiments 18-33:
wherein each of the two or more non-redundant downlink transmissions carries data from the same application layer file; or
wherein each of the one or more non-redundant uplink transmissions on the first uplink serving cell (18A), and each of the one or more non-redundant uplink transmissions on the second uplink serving cell (18B), carries data from the same application layer file.
35. A wireless device (14) configured to:
receive, on a physical downlink control channel, a downlink control information message (20) that schedules:
two or more non-redundant downlink transmissions to be transmitted to the wireless device (14) in respective transmission time intervals, TTIs, on a first downlink serving cell (16A) of the wireless device (14); or
one or more non-redundant uplink transmissions to be transmitted from the wireless device (14) in one or more respective TTIs on a first uplink serving cell (18A) of the wireless device (14) and one or more non-redundant uplink transmissions to be transmitted from the wireless device (14) in one or more respective TTIs on a second uplink serving cell (18B) of the wireless device (14).
36. The wireless device (14) of embodiment 35, configured to perform the method of any of embodiments 2-17.

37. A radio network node (12) configured to:
  transmit, on a physical downlink control channel to a wireless device (14), a downlink control information message (20) that schedules:
    two or more non-redundant downlink transmissions to be transmitted to the wireless device (14) in respective transmission time intervals, TTIs, on a first downlink serving cell (16A) of the wireless device (14); or
    one or more non-redundant uplink transmissions to be transmitted from the wireless device (14) in one or more respective TTIs on a first uplink serving cell (18A) of the wireless device (14) and one or more non-redundant uplink transmissions to be transmitted from the wireless device (14) in one or more respective TTIs on a second uplink serving cell (18B) of the wireless device (14).
38. The radio network node (12) of embodiment 37, configured to perform the method of any of embodiments 19-34.
39. A computer program comprising instructions which, when executed by at least one processor of a wireless device (14), causes the wireless device (14) to perform the method of any of embodiments 1-17.
40. A computer program comprising instructions which, when executed by at least one processor of a radio network node (12), causes the radio network node (12) to perform the method of any of embodiments 18-34.
41. A carrier containing the computer program of any of embodiments 39-40, wherein the carrier is one of an electronic signal, optical signal, radio signal, or computer readable storage medium.
42. A wireless device (14) comprising:
  communication circuitry (1220); and
  processing circuitry (1210) configured to receive, on a physical downlink control channel, a downlink control information message (20) that schedules:
    two or more non-redundant downlink transmissions to be transmitted to the wireless device (14) in respective transmission time intervals, TTIs, on a first downlink serving cell (16A) of the wireless device (14); or
    one or more non-redundant uplink transmissions to be transmitted from the wireless device (14) in one or more respective TTIs on a first uplink serving cell (18A) of the wireless device (14) and one or more non-redundant uplink transmissions to be transmitted from the wireless device (14) in one or more respective TTIs on a second uplink serving cell (18B) of the wireless device (14).
43. The wireless device (14) of embodiment 42, the processing circuitry (1210) configured to perform the method of any of embodiments 2-17.
44. A radio network node (12) comprising:
  communication circuitry (1320); and
  processing circuitry (1310) configured to transmit, on a physical downlink control channel to a wireless device (14), a downlink control information message (20) that schedules:
    two or more non-redundant downlink transmissions to be transmitted to the wireless device (14) in respective transmission time intervals, TTIs, on a first downlink serving cell (16A) of the wireless device (14); or
    one or more non-redundant uplink transmissions to be transmitted from the wireless device (14) in one or more respective TTIs on a first uplink serving cell (18A) of the wireless device (14) and one or more non-redundant uplink transmissions to be transmitted from the wireless device (14) in one or more respective TTIs on a second uplink serving cell (18B) of the wireless device (14).
45. The radio network node (12) of embodiment 44, the processing circuitry (1310) configured to perform the method of any of embodiments 19-34.

What is claimed is:
1. A method performed by a wireless device, the method comprising:
  receiving, on a physical downlink control channel, a downlink control information message that schedules:
    two or more non-redundant downlink transmissions to be transmitted to the wireless device in respective transmission time intervals (TTIs) on a first downlink serving cell of the wireless device; or
    two or more non-redundant uplink transmissions to be transmitted from the wireless device in respective TTIs on a first uplink serving cell of the wireless device;
  wherein the downlink control information message includes:
    one or more common parameters that are each common to all non-redundant downlink transmissions or all non-redundant uplink transmissions scheduled by the downlink control information message; and
    one or more transmission-specific parameters that are each specific to a certain non-redundant downlink transmission or non-redundant uplink transmission scheduled by the downlink control information message,
      wherein at least one of the one or more transmission-specific parameters is a modulation and coding scheme parameter; and
  wherein the downlink control information message schedules:
    the two or more non-redundant downlink transmissions to be transmitted to the wireless device in respective TTIs on the first downlink serving cell of the wireless device and one or more non-redundant downlink transmissions to be transmitted to the wireless device in one or more respective TTIs on a second downlink serving cell of the wireless device; or
    the two or more non-redundant uplink transmissions to be transmitted from the wireless device in respective TTIs on the first uplink serving cell of the wireless device and one or more non-redundant uplink transmissions to be transmitted from the wireless device in one or more respective TTIs on a second uplink serving cell of the wireless device.
2. The method of claim 1, further comprising receiving the two or more non-redundant downlink transmissions on the first downlink serving cell and the one or more non-redundant downlink transmissions on the second downlink serving cell, or transmitting the two or more non-redundant uplink transmissions on the first uplink serving cell and the one or more non-redundant uplink transmissions on the second uplink serving cell, according to the received downlink control information message.
3. The method of claim 1, wherein the downlink control information message:
  indicates in how many TTIs the two or more non-redundant downlink transmissions are to be transmitted on the first downlink serving cell, and/or in how many

TTIs the two or more non-redundant downlink transmissions are to be transmitted on the second downlink serving cell; or indicates in how many TTIs the two or more non-redundant uplink transmissions are to be transmitted on the first uplink serving cell, and/or in how many TTIs the two or more non-redundant uplink transmissions are to be transmitted on the second uplink serving cell.

4. The method of claim 1, wherein the downlink control information message includes, for each of multiple serving cells on which the downlink control information message schedules transmissions:

one or more cell-specific parameters that are each specific to the serving cell and common to all non-redundant downlink transmissions or all non-redundant uplink transmissions scheduled by the downlink control information message for transmission on that serving cell.

5. The method of claim 1, wherein:

at least some of the TTIs in which the two or more non-redundant downlink transmissions are to be transmitted on the first downlink serving cell are non-consecutive TTIs, and/or at least some of the one or more TTIs in which the one or more non-redundant downlink transmissions are to be transmitted on the second downlink serving cell are non-consecutive TTIs; or at least some of the two or more TTIs in which the one or more non-redundant uplink transmissions are to be transmitted on the first uplink serving cell are non-consecutive TTIs, and/or at least some of the one or more TTIs in which the one or more non-redundant uplink transmissions are to be transmitted on the second uplink serving cell are non-consecutive TTIs.

6. The method of claim 1, wherein the downlink control information message has a certain message format, and wherein the method further comprises receiving control plane signaling that configures whether and/or how the wireless device is to attempt to decode received downlink control information messages according to the certain message format.

7. The method of claim 1, wherein a TTI is a number of Orthogonal Frequency Division Multiplexing (OFDM) symbols over which a non-redundant downlink transmission or a non-redundant uplink transmission spans.

8. The method of claim 1:

wherein each of the two or more non-redundant downlink transmissions on the first downlink serving cell, and each of the one or more non-redundant downlink transmissions on the second downlink serving cell, carries data from the same application layer file; or wherein each of the two or more non-redundant uplink transmissions on the first uplink serving cell, and each of the one or more non-redundant uplink transmissions on the second uplink serving cell, carries data from the same application layer file.

9. The method of claim 1, wherein the downlink control information message schedules the two or more non-redundant downlink transmissions to be transmitted to the wireless device in respective TTIs on the first downlink serving cell of the wireless device and the one or more non-redundant downlink transmissions to be transmitted to the wireless device in one or more respective TTIs on the second downlink serving cell of the wireless device.

10. The method of claim 1:

wherein each of the two or more non-redundant downlink transmissions on the first downlink serving cell, and each of the one or more non-redundant downlink transmissions on the second downlink serving cell, carries data from the same video frame; or wherein each of the two or more non-redundant uplink transmissions on the first uplink serving cell, and each of the one or more non-redundant uplink transmissions on the second uplink serving cell, carries data from the same video frame.

11. A method performed by a radio network node, the method comprising:

transmitting, on a physical downlink control channel to a wireless device, a downlink control information message that schedules:

two or more non-redundant downlink transmissions to be transmitted to the wireless device in respective transmission time intervals (TTIs) on a first downlink serving cell of the wireless device; or two or more non-redundant uplink transmissions to be transmitted from the wireless device in respective TTIs on a first uplink serving cell of the wireless device;

wherein the downlink control information message includes:

one or more common parameters that are each common to all non-redundant downlink transmissions or all non-redundant uplink transmissions scheduled by the downlink control information message; and one or more transmission-specific parameters that are each specific to a certain non-redundant downlink transmission or non-redundant uplink transmission scheduled by the downlink control information message, wherein at least one of the one or more transmission-specific parameters is a modulation and coding scheme parameter; and wherein the downlink control information message schedules:

the two or more non-redundant downlink transmissions to be transmitted to the wireless device in respective TTIs on the first downlink serving cell of the wireless device and one or more non-redundant downlink transmissions to be transmitted to the wireless device in one or more respective TTIs on a second downlink serving cell of the wireless device; or the two or more non-redundant uplink transmissions to be transmitted from the wireless device in respective TTIs on the first uplink serving cell of the wireless device and one or more non-redundant uplink transmissions to be transmitted from the wireless device in one or more respective TTIs on a second uplink serving cell of the wireless device.

12. The method of claim 11:

wherein each of the two or more non-redundant downlink transmissions on the first downlink serving cell, and each of the one or more non-redundant downlink transmissions on the second downlink serving cell, carries data from the same application layer file; or wherein each of the two or more non-redundant uplink transmissions on the first uplink serving cell, and each of the one or more non-redundant uplink transmissions on the second uplink serving cell, carries data from the same application layer file.

13. The method of claim 11, wherein the downlink control information message schedules the two or more non-redundant downlink transmissions to be transmitted to the wireless device in respective TTIs on the first downlink serving cell of the wireless device and the one or more non-redundant downlink transmissions to be transmitted to the wireless device in one or more respective TTIs on the second downlink serving cell of the wireless device.

14. The method of claim 11:
wherein each of the two or more non-redundant downlink transmissions on the first downlink serving cell, and each of the one or more non-redundant downlink transmissions on the second downlink serving cell, carries data from the same video frame; or
wherein each of the two or more non-redundant uplink transmissions on the first uplink serving cell, and each of the one or more non-redundant uplink transmissions on the second uplink serving cell, carries data from the same video frame.

15. A wireless device comprising:
communication circuitry; and
processing circuitry configured to cause the wireless device to receive, on a physical downlink control channel, a downlink control information message that schedules:
two or more non-redundant downlink transmissions to be transmitted to the wireless device in respective transmission time intervals (TTIs) on a first downlink serving cell of the wireless device; or
two or more non-redundant uplink transmissions to be transmitted from the wireless device in respective TTIs on a first uplink serving cell of the wireless device;
wherein the downlink control information message includes:
one or more common parameters that are each common to all non-redundant downlink transmissions or all non-redundant uplink transmissions scheduled by the downlink control information message; and
one or more transmission-specific parameters that are each specific to a certain non-redundant downlink transmission or non-redundant uplink transmission scheduled by the downlink control information message,
wherein at least one of the one or more transmission-specific parameters is a modulation and coding scheme parameter; and
wherein the downlink control information message schedules:
the two or more non-redundant downlink transmissions to be transmitted to the wireless device in respective TTIs on the first downlink serving cell of the wireless device and one or more non-redundant downlink transmissions to be transmitted to the wireless device in one or more respective TTIs on a second downlink serving cell of the wireless device; or
the two or more non-redundant uplink transmissions to be transmitted from the wireless device in respective TTIs on the first uplink serving cell of the wireless device and one or more non-redundant uplink transmissions to be transmitted from the wireless device in one or more respective TTIs on a second uplink serving cell of the wireless device.

16. The wireless device of claim 15, wherein the downlink control information message schedules the two or more non-redundant downlink transmissions to be transmitted to the wireless device in respective TTIs on the first downlink serving cell of the wireless device and the one or more non-redundant downlink transmissions to be transmitted to the wireless device in one or more respective TTIs on the second downlink serving cell of the wireless device.

17. The wireless device of claim 15,
wherein each of the two or more non-redundant downlink transmissions on the first downlink serving cell, and each of the one or more non-redundant downlink transmissions on the second downlink serving cell, carries data from the same video frame; or
wherein each of the two or more non-redundant uplink transmissions on the first uplink serving cell, and each of the one or more non-redundant uplink transmissions on the second uplink serving cell, carries data from the same video frame.

18. A radio network node comprising:
communication circuitry; and
processing circuitry configured to cause the radio network node to transmit, on a physical downlink control channel to a wireless device, a downlink control information message that schedules:
two or more non-redundant downlink transmissions to be transmitted to the wireless device in respective transmission time intervals, TTIs, on a first downlink serving cell of the wireless device; or
two or more non-redundant uplink transmissions to be transmitted from the wireless device in respective TTIs on a first uplink serving cell of the wireless device;
wherein the downlink control information message includes:
one or more common parameters that are each common to all non-redundant downlink transmissions or all non-redundant uplink transmissions scheduled by the downlink control information message; and
one or more transmission-specific parameters that are each specific to a certain non-redundant downlink transmission or non-redundant uplink transmission scheduled by the downlink control information message,
wherein at least one of the one or more transmission-specific parameters is a modulation and coding scheme parameter; and
wherein the downlink control information message schedules:
the two or more non-redundant downlink transmissions to be transmitted to the wireless device in respective TTIs on the first downlink serving cell of the wireless device and one or more non-redundant downlink transmissions to be transmitted to the wireless device in one or more respective TTIs on a second downlink serving cell of the wireless device; or
the two or more non-redundant uplink transmissions to be transmitted from the wireless device in respective TTIs on the first uplink serving cell of the wireless device and one or more non-redundant uplink transmissions to be transmitted from the wireless device in one or more respective TTIs on a second uplink serving cell of the wireless device.

19. The radio network node of claim 18, wherein the downlink control information message schedules the two or more non-redundant downlink transmissions to be transmitted to the wireless device in respective TTIs on the first downlink serving cell of the wireless device and the one or more non-redundant downlink transmissions to be transmitted to the wireless device in one or more respective TTIs on the second downlink serving cell of the wireless device.

20. The radio network node of claim 18,
wherein each of the two or more non-redundant downlink transmissions on the first downlink serving cell, and each of the one or more non-redundant downlink transmissions on the second downlink serving cell, carries data from the same video frame; or wherein each of the two or more non-redundant uplink transmissions on the first uplink serving cell, and each of the one or more non-redundant uplink transmissions on the second uplink serving cell, carries data from the same video frame.

\* \* \* \* \*